(12) United States Patent
Giummo

(10) Patent No.: US 9,413,214 B2
(45) Date of Patent: Aug. 9, 2016

(54) APPARATUS AND METHOD FOR ENERGY CONVERSION

(71) Applicant: Daniel Giummo, Lincroft, NJ (US)

(72) Inventor: Daniel Giummo, Lincroft, NJ (US)

(*) Notice: Subject to any disclaimer, the term of this patent is extended or adjusted under 35 U.S.C. 154(b) by 712 days.

(21) Appl. No.: 13/815,186

(22) Filed: Feb. 5, 2013

(65) Prior Publication Data

US 2013/0147298 A1    Jun. 13, 2013

Related U.S. Application Data

(63) Continuation-in-part of application No. PCT/IB2010/001959, filed on Aug. 5, 2010.

(51) Int. Cl.
*H02K 21/00* (2006.01)
*H02K 53/00* (2006.01)

(52) U.S. Cl.
CPC ............. *H02K 21/00* (2013.01); *H02K 53/00* (2013.01)

(58) Field of Classification Search
CPC .............................. H02K 21/00; H02K 53/00
USPC .................................... 310/83, 99, 49.47, 152
See application file for complete search history.

(56) References Cited

U.S. PATENT DOCUMENTS

| | | | | |
|---|---|---|---|---|
| 3,676,719 A * | 7/1972 | Pecci | ..................... | H02K 7/065 310/24 |
| 3,783,833 A * | 1/1974 | Bailey | .................... | A01K 41/06 119/319 |
| 3,811,058 A | 5/1974 | Kiniski | | |
| 3,879,622 A * | 4/1975 | Ecklin | .................... | H02K 53/00 310/103 |
| 3,895,245 A * | 7/1975 | Bode | ..................... | H02K 25/00 310/103 |
| 4,012,675 A * | 3/1977 | Schulze, Jr. | ............ | H02K 33/14 310/24 |
| 4,128,020 A * | 12/1978 | Gray | ..................... | F16F 15/30 310/153 |
| 4,684,834 A * | 8/1987 | Hartman, Sr. | ......... | H02K 7/065 310/24 |
| 5,219,034 A * | 6/1993 | Wortham | ................ | B60K 1/00 180/65.1 |
| 5,233,251 A * | 8/1993 | Nehmer | ................ | H02K 25/00 310/167 |
| 6,209,495 B1 * | 4/2001 | Warren | .................. | F01B 9/026 123/197.4 |
| 6,731,035 B2 | 5/2004 | Mu et al. | | |
| 2005/0001500 A1 | 1/2005 | Chertok | | |
| 2007/0210659 A1 | 9/2007 | Long | | |
| 2008/0024017 A1 * | 1/2008 | Chen | ..................... | H02K 53/00 310/36 |
| 2010/0048342 A1 * | 2/2010 | Chadwick | ................ | F16H 1/32 475/181 |

* cited by examiner

*Primary Examiner* — Naishadh Desai
(74) *Attorney, Agent, or Firm* — Brian K. Johnson, Esq., LLC.

(57) ABSTRACT

A method and apparatus for energy generation and conservation uses magnets to repetitively provide rotational mechanical energy. An actuator arm and coupled magnet is inserted into a rotating plane defined by other magnets which are positioned to do work based on the electro-magnetic relationships among the magnets. In one aspect, the magnets are actually comprised of a plurality of magnets so as to create a specific magnetic field. In another aspect, an actuator magnet moves in relation to a drive magnet and follows a path as perpendicular as possible to the magnetic field of the drive magnets. Consequently, a minimal energy path is taken through the magnetic field and a relatively small amount of input energy is required to operate the device. Using minimal energy to create potential energy also enhances the apparatus by minimizing the extinction of motion therein due to friction while powering other mechanisms.

14 Claims, 19 Drawing Sheets

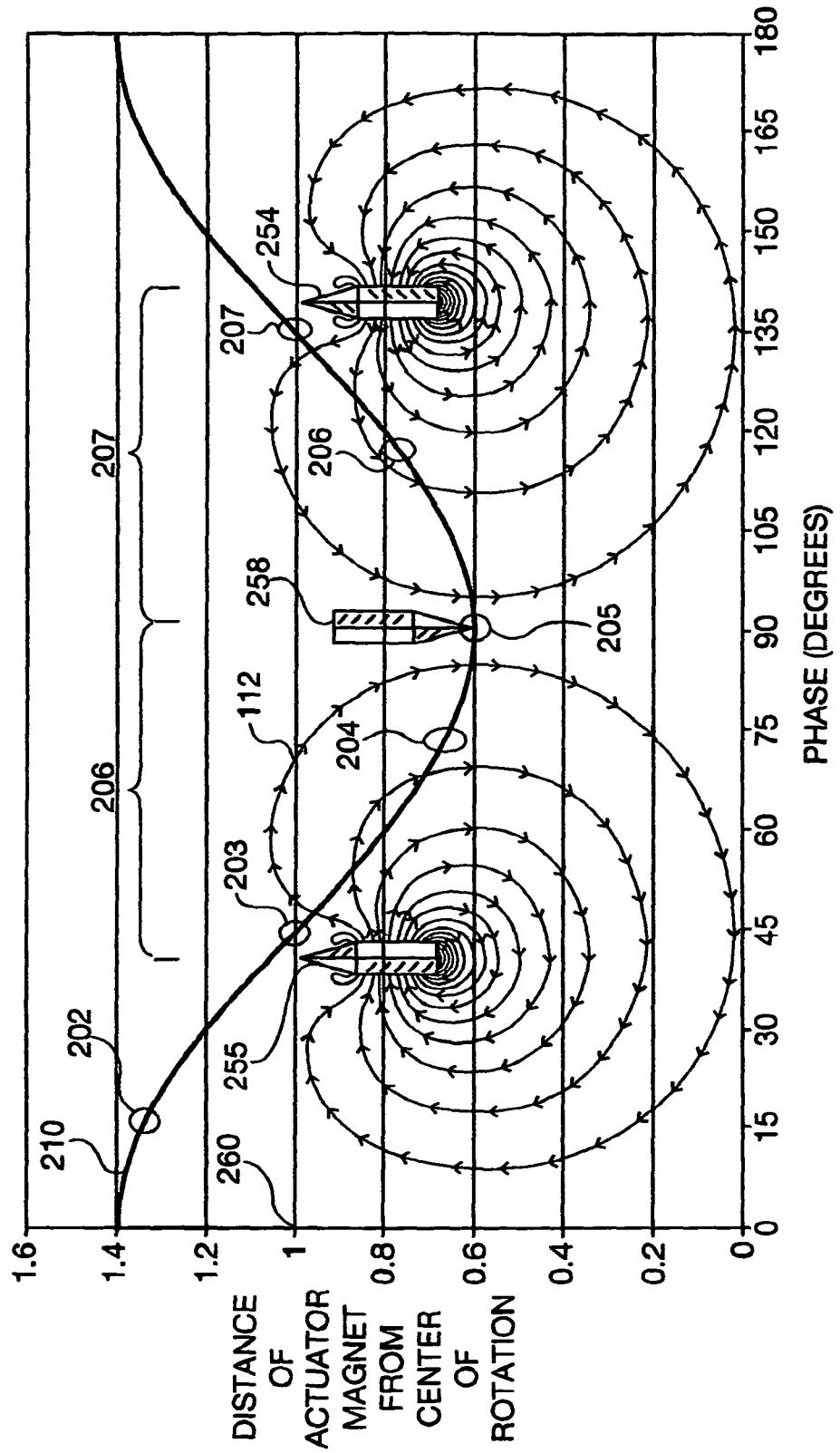

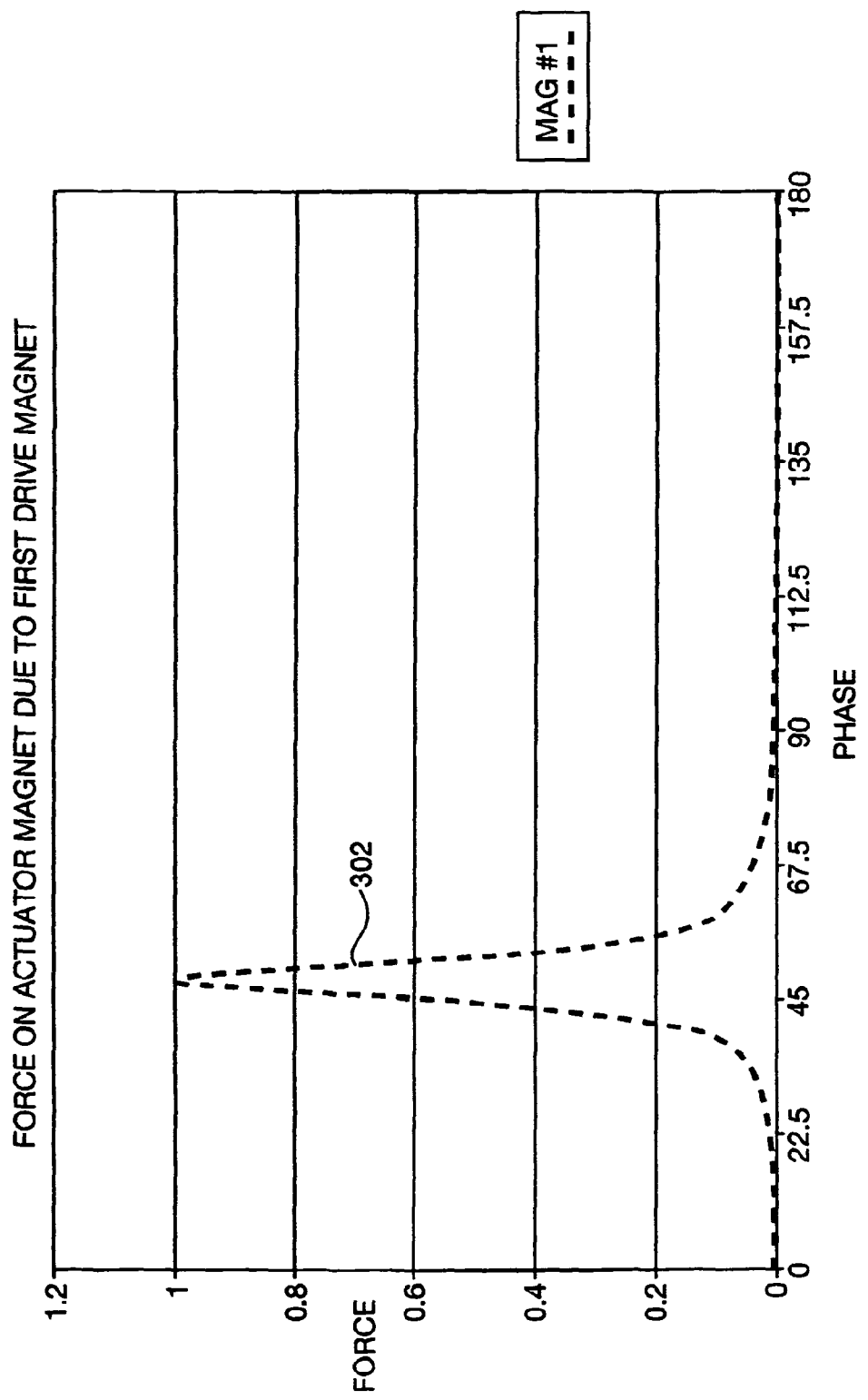

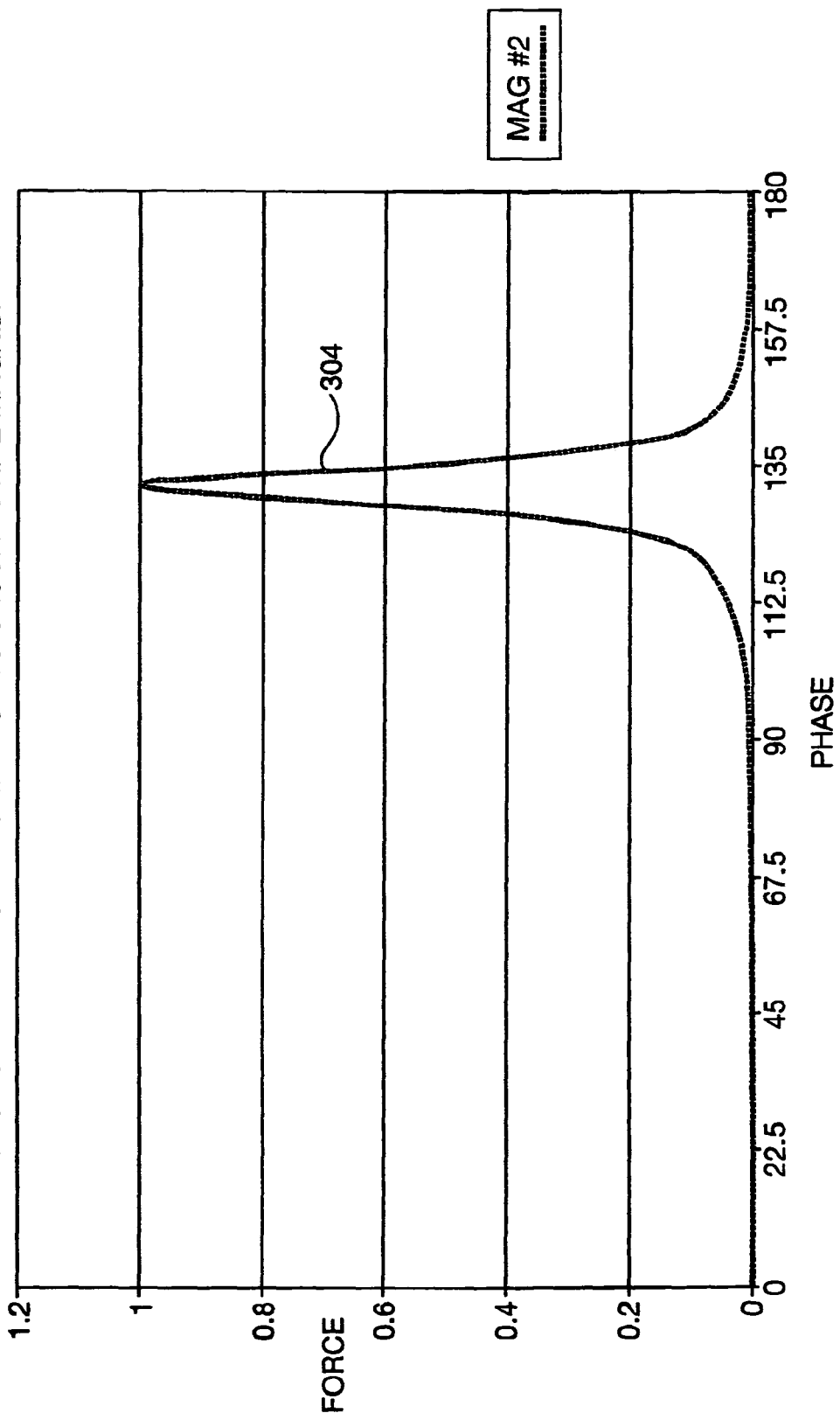

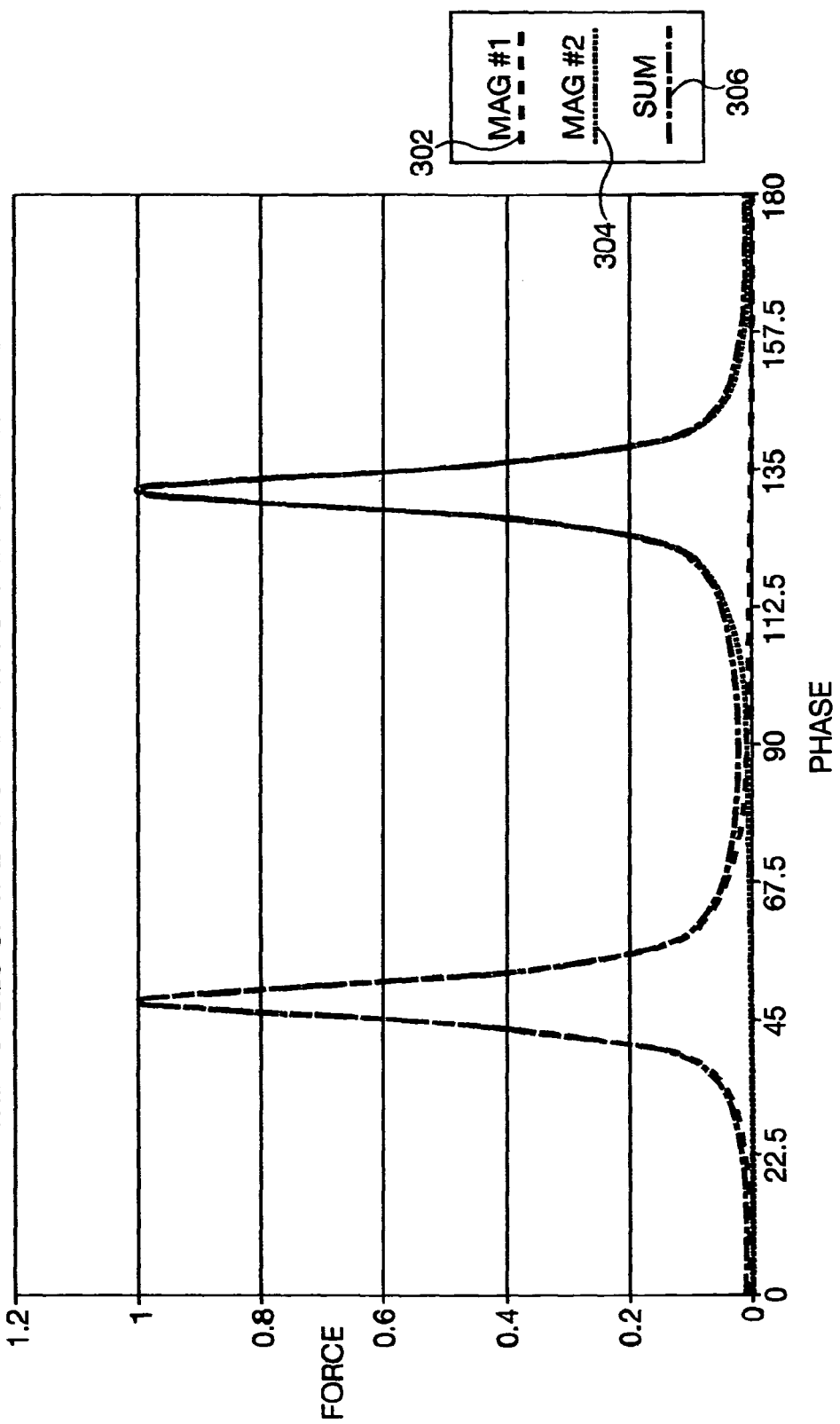

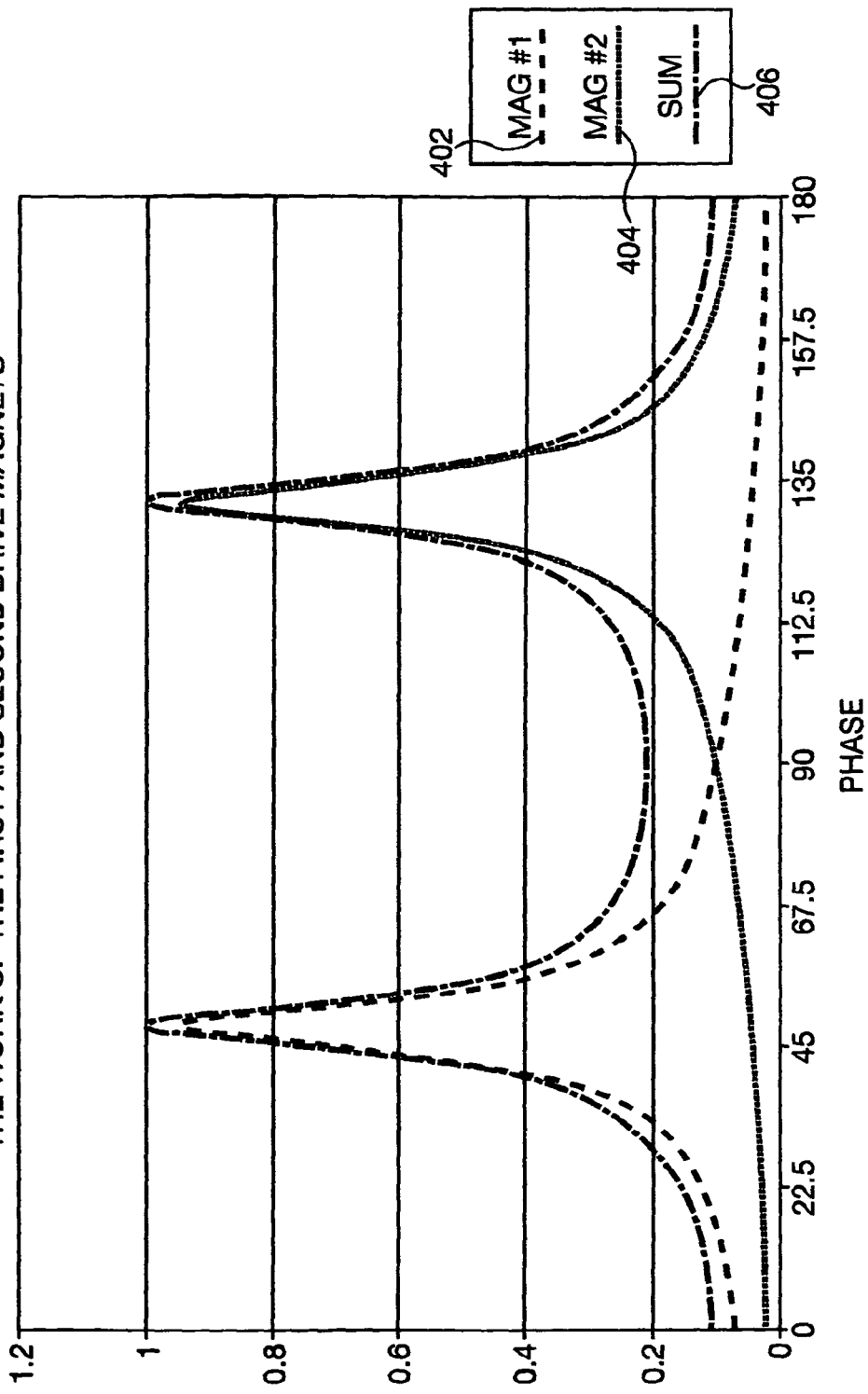

APPARATUS AND METHOD FOR ENERGY CONVERSION

CROSS REFERENCE TO RELATED APPLICATIONS

This application is a continuation-in-part of and claims priority to and the benefit of commonly-owned PCT Application No. PCT/IB2010/001959 filed Aug. 5, 2010 titled "Neodymium Energy Generator" which is incorporated by reference herein in its entirety.

BACKGROUND OF THE INVENTION

The patent relates generally to an apparatus for converting an initial impulse of mechanical energy using drive magnets into a repetitive energy generation and preservation apparatus using actuator magnets. Existing autogenic machines are energy machines that are theoretically self-sustaining mechanisms, within the restrictions of the limiting principles of thermodynamics, such that the energy needed to operate them is maintained once they are started with an initial energy impulse.

Prior art systems have attempted to implement such autogenic machines. U.S. Pat. No. 6,731,035, issued May 4, 2004 to Mu, discloses an "Apparatus for Generating Autogenic Energy." In Mu, a singular magnet attached to a rotating shaft interacts with a second magnet attached to a connection rod to create a force that pushes the connection rod away from the rotating shaft. The kinetic energy imparted to the connection rod is transmitted back to the rotating shaft via a connecting rod and crank. The rotating shaft then acts as a fly wheel as it pulls the magnet on the rotating shaft back into close proximity of the rotating magnet such that the cycle is renewed to start once again.

U.S. Pat. No. 3,811,058, issued May 13, 1974 to Kiniski, can be used to improve Mu's design. Kiniski's system contains a plurality of rotating magnets whose magnetic fields are exerted on another plurality of magnets so as to provide a reasonably continuous force on a crank shaft. However, the interaction of magnetic fields is via linear positioning such that the magnets are displaced in close proximity to one another, but not within the operational area of the rotating or spinning magnets. This system results in a relatively weak interoperating magnetic force that declines and decays at a rapid rate as the apparatus is operated.

Thus the prior art of autogenic machines is lacking in certain aspects. First, none of the prior art discloses multi-component magnets used to specifically condition the magnetic field of an actuator magnet such that the work portion of the autogenic cycle is optimized. Second, none of the prior art discloses the introduction of actuator magnets into the areas of the system in which the drive portion is spinning or rotating. Thus the need exists for such a machine to improve the autogenic characteristics of the same.

The Neodymium Energy Generator is an energy machine that uses magnets to continually provide rotational mechanical energy. This is accomplished by a mechanical rig that uses the energy of one magnet to place another magnet in a position to do work. The second magnet in turn provides the energy for the next magnet to do work, and so on. One important characteristic of this design is the movement of one magnet into another magnetic field through a path that is relatively perpendicular to the field lines. By moving a magnet into an external magnetic field through a path that is relatively perpendicular to the field lines, potential energy is created while using a relatively small amount of energy in making that movement.

BRIEF SUMMARY OF THE INVENTION

In one particularly preferred embodiment, an apparatus for sustaining motion is provided that includes: a plurality of actuators each having an actuator magnet coupled to an actuator arm, at least one of the actuator magnets being comprised of a plurality of magnets, the actuator arm coupled to a rod, the rod coupled to a crank which is coupled to a crank gear, the crank gear meshably engaged with a spacing gear; and a drive gear meshably engaged with each of the spacing gears, the drive gear coupled to a drive shaft disposed in the rotational center of the drive gear, the drive shaft coupled to a plurality of drive arms, each drive arm coupled to a drive magnet, the actuator magnets being alternately attracted and repelled by the drive magnets when the central gear in spinning so as to continuously rotate the spacing gears, the crank gears, and the cranks to push the rods and move the actuator arms and actuator magnets towards and away from the drive shaft.

In particular refinements to this apparatus, each of the drive magnets are within a first common plane, each of the actuator magnets are in a second common plane and the first and second common planes are also coplanar; or at least one of the drive magnets is comprised of a plurality of magnets; or the plurality of magnets of the actuator includes a first magnet portion disposed towards the actuator arm and a second magnet portion disposed away from the actuator arm; and the first and second magnets portions each have two poles, the first and second magnet portions being coupled such that the poles of the two magnets are disposed opposite one another and the first magnet portion is a rectangular prism and the second magnet portion is a triangular prism containing a pointed tip, the pointed end of the triangular prism being disposed at an end of the actuator such that the pointed end is the part of the actuator magnet that is closest to the drive shaft and the magnetic field created by the second magnet portion cancels a portion of the magnetic field created by the first magnet portion. In other variations, the plurality of drive arms are spaced at alternating angular displacements of 80 degrees and 100 degrees about the drive shaft; or the plurality of magnets of the actuator are one or more electromagnets and the operation of the electromagnet is computer-controlled.

In another particularly preferred embodiment, An apparatus for sustaining motion is provided including: a plurality of actuators each having an actuator magnet coupled to a actuator arm, the actuator arm coupled to a crank which is coupled to a crank support, the crank support coupled to a central support; the central support coupled to a drive shaft disposed in the rotational center of the central support, the drive shaft coupled to a plurality of drive arms, each drive arm coupled to a drive magnet, the plurality of drive magnets creating a plane or rotation when the drive shaft is rotated, the actuator magnets being alternately attracted to and repelled by the drive magnets so as to continuously rotate the central support, the crank support and the crank to move the actuator arm and actuator magnet towards and away from the drive shaft, the actuator magnets being disposed within the plane of rotation for a portion of a period of central gear rotation.

In refinements to this embodiment, the plane of rotation is a first common plane, each of the actuator magnets are in a second common plane and the first and second common planes are also coplanar; or each of the actuator magnets includes a first magnet portion disposed towards the actuator arm and a second magnet portion disposed away from the actuator arm, the first and second magnets portions each having two poles, the first and second magnet portions being coupled such that the poles of the two magnets are disposed opposite one another and each of the drive magnets include a first magnet portion disposed towards the drive shaft and a second magnet portion disposed away from the drive shaft, the first and second magnet portions each having two poles, the first and second magnet portions being coupled such that the poles of the two magnets are disposed opposite one another and the first magnet potion of a first drive magnet and the first magnet potion of the actuator magnet are arranged such that the poles are opposite one another when the actuator is entering the plane of rotation and the first magnet portions repel each other, and the first magnet portion of a second drive magnet and the first magnet potion of the actuator magnet are arranged such that the poles are the same as one another when the actuator is exiting the plane of rotation and the first magnet portions attract each other. In other variations, the plurality of magnets of the actuator are one or more electromagnets and the operation of the electromagnet is computer-controlled.

In a particularly preferred method for sustaining motion within a magnetically operating apparatus the following steps are provided: inserting an actuator arm into a plane of rotation, the actuator arm having an actuator magnet coupled thereto, the plane of rotation created by the rotation of a plurality of drive arms each drive arm coupled to a drive magnet at one end and a drive shaft at the other, the outer edge of the plane of rotation defined by the ends of the plurality of drive magnets; extracting the actuator arm from the plane of rotation; and repeating the steps of inserting and extracting with a plurality of the actuator arms so as to continuously rotate the drive shaft.

In certain refinements to this method, the plurality of actuator arms are inserted into and extracted from the plane of rotation sequentially, the insertions occurring only during a work period of the drive shaft rotation; or the method further including providing power to an apparatus attached to the drive shaft through the rotation of the drive shaft.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 5A is a graph of the actuator magnet displacement vs. rotational phase according to an embodiment of the invention;

FIG. 5B-5C are graphs of the normalized forces on the actuator magnet due to the first and second rotating drive magnets respectively according to an embodiment of the invention;

FIG. 5D is a graph of the sum of the normalized forces on the actuator magnet due to the first and second rotating drive magnets according to an embodiment of the invention; and FIG. 5E is a graph of the sum of the work performed by the actuator magnet due to the first and second rotating drive magnets according to an embodiment of the invention.

DETAILED DESCRIPTION OF THE INVENTION

To facilitate a clear understanding of the present invention, illustrative examples are provided herein which describe certain aspects of the invention. However, it is to be appreciated that these illustrations are not meant to limit the scope of the invention, and are provided herein to illustrate certain concepts associated with the invention. Specifically, the construction of the magnets may be varied to optimize the magnetic fields produced by them in order to accomplish the objectives of the invention. Also, the various portions of the apparatus may be constructed using intermeshing gears, belt drives or other suitable mechanical interconnecting elements to achieve the objects of the invention.

Figure 1:
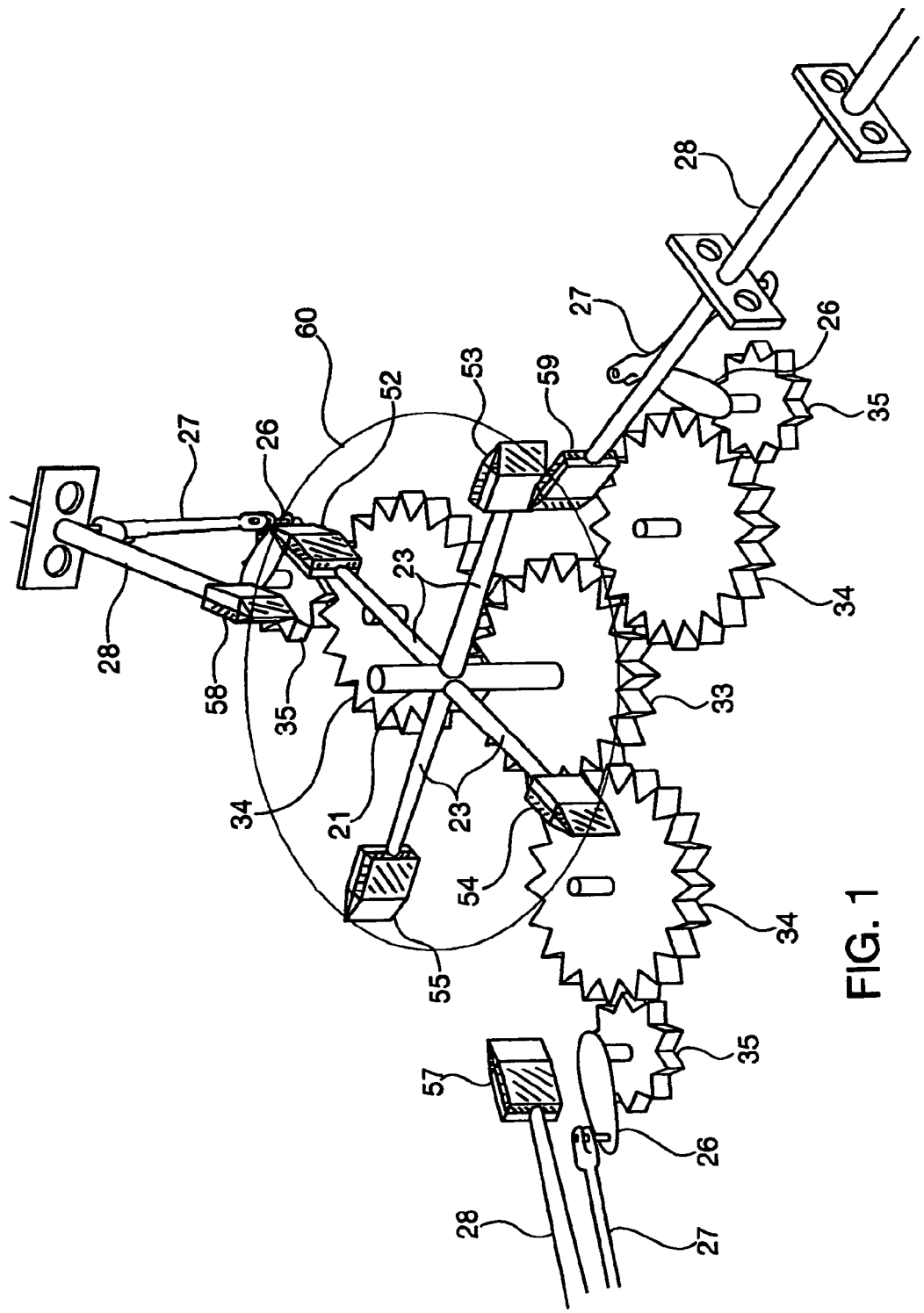
FIG. 1 is a perspective view of the invention according to one preferred embodiment.

FIG. 1 shows an overall system for maintaining rotational transmission of autogenic energy. Drive shaft 21 is disposed at the rotational and axial center of central gear 33. A plurality of drive arms 23 are coupled to drive shaft 21. At the other end of the drive arms, distal from the connection to drive shaft 21, are coupled drive magnets 52, 53, 54 & 55. In one embodiment, drive arms and drive magnets are arranged and attached to drive shaft 21 such that the rotation of central gear 33 causes the drive arms 23 and drive magnets 52-55 to all rotate in a singular first plane of rotation. The outside boundary or perimeter of that plane of rotation 60 is defined by the path traversed by the farthest most tips of the drive magnets as the drive gear 33 rotates through a complete 360° revolution.

Drive gear 33 is meshably engaged with a plurality of spacing gears 34 such that rotation of drive gear 33 causes each of spacing gears 34 to rotate in unison. Spacing gears 34 are likewise meshably engaged with a plurality of crank gears 35 such that rotation of each spacing gear 34 causes each of crank gears 35 to rotate in unison. Each crank gear 35 is coupled to a crank 26, which in turn is coupled to rod 27. Each rod 27 is coupled to actuator arm 28 having an actuator magnet, 57, 58, & 59, disposed at the end of the actuator arm. Rotation of crank gear 35 causes crank 26 to move in a circle about the central axis of the crank gear 35 such that the oblate rotation of crank 26 causes rod 27 to move the actuator arm linearly and alternatively towards and away from drive shaft 21.

Figure 2A:
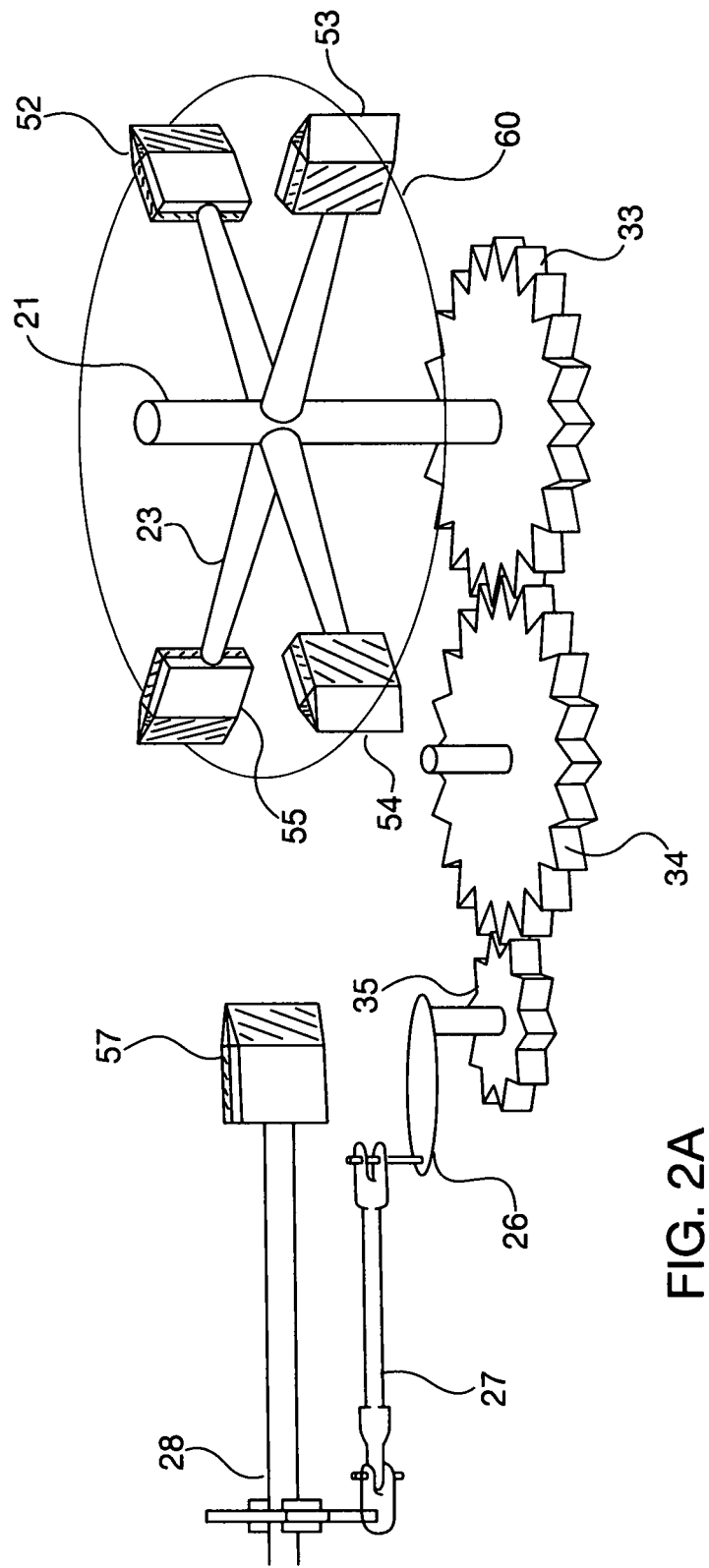
FIGS. 2A and 2B are perspective and top views respectively of one actuator mechanism and coupled drive mechanism according to an embodiment of the invention.
Figure 2B:
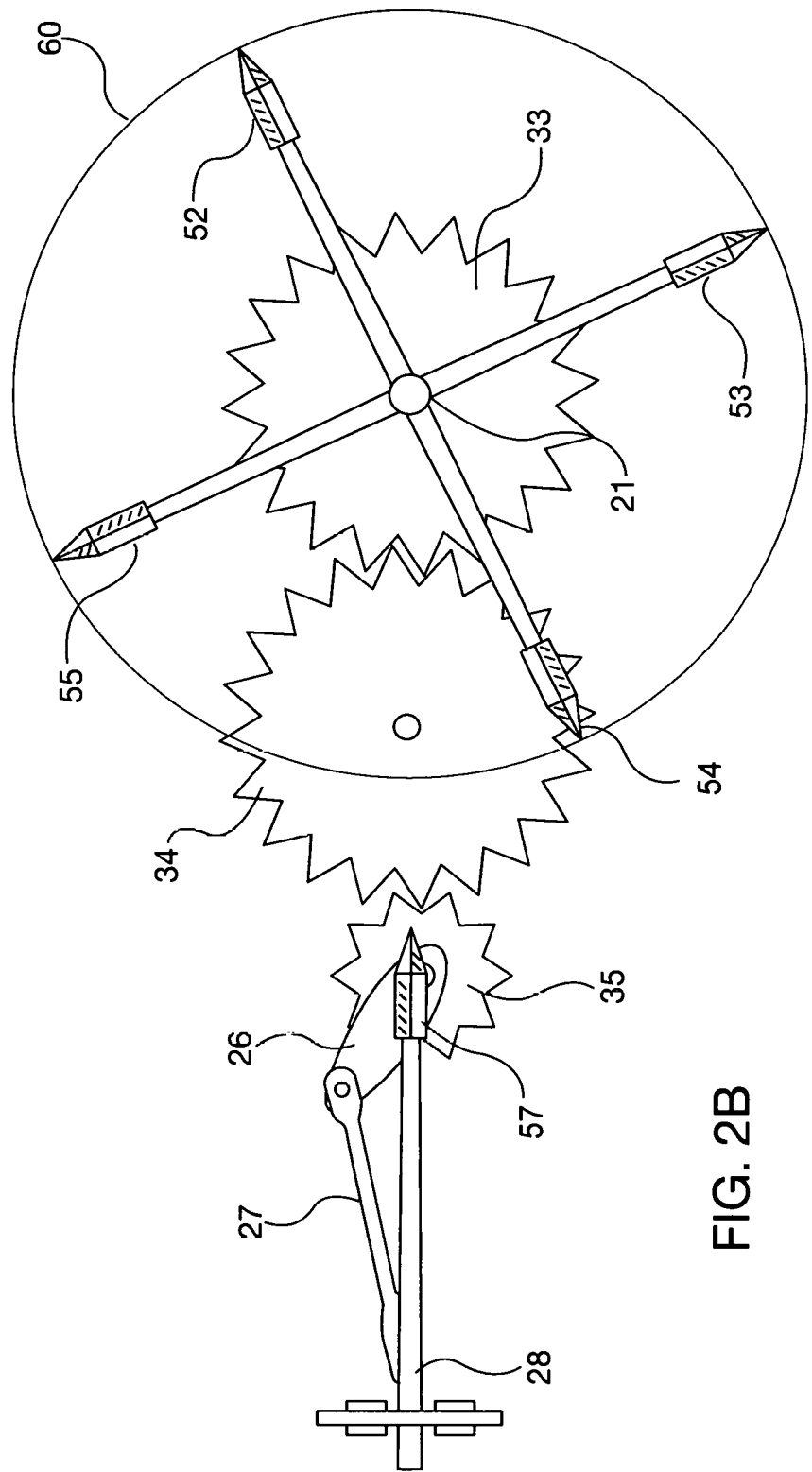

The above-described operation of the crank gear 35, crank 26, rod 27 and actuator arm 28 (all comprising and actuator subassembly) is performed simultaneously by each of the plurality of actuator subassemblies. FIGS. 2A and 2B show the physical relationship of one of the actuator subassembly in relation to the drive elements. The operational characteristics of the actuator magnet 57 vis-à-vis the outside boundary of the plane of rotation of the drive arms and drive magnets is defined by the dimensioning of the gear sizing, 33, 34, 35, the lengths of the drive arms and actuator arms, 23 & 28, the length and positioning of the crank 26 and rod 27 and the initial positioning of the actuator magnet within the entire system. The operational characteristics are also determined by the angle between the drive arms. In FIGS. 1 and 2 these angles are all a uniform 90°. From a work standpoint, however, other angles may be desirable as described below. Ideally, one rotation of drive gear 33 results in two full rotations or insertions (cycles) of two of the actuator subassembly. Also desirably, the actuator magnets are coordinated in their initial positions such that they are at equally spaced positions within their rotational cycles. I.e. if there are three actuators, they are positioned such that they are spaced 120° out of phase with adjacent actuators, and if there are four actuator arms, they are spaced 90° out of phase with adjacent actuators, etc.

Figure 2C:
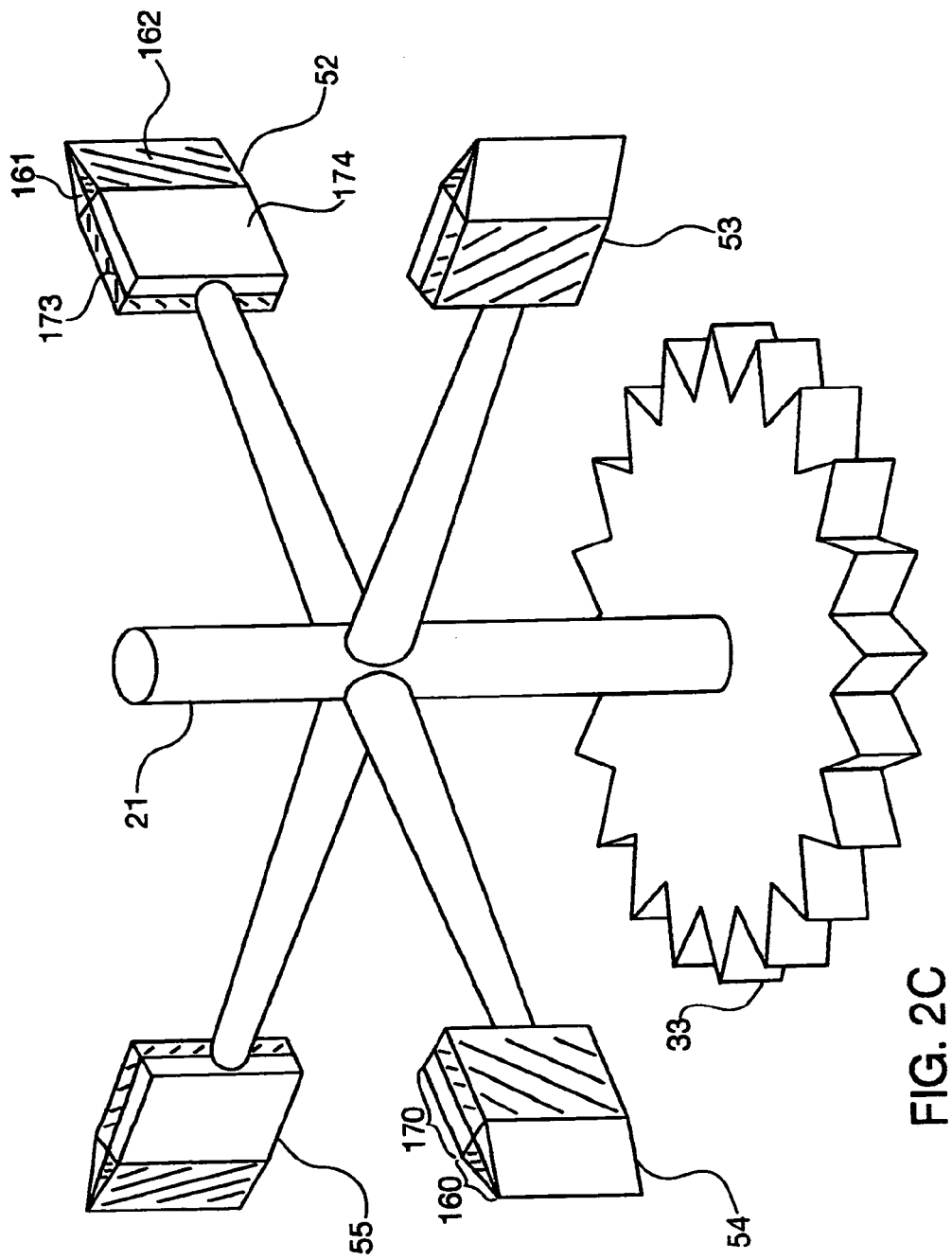
FIG. 2C is a perspective view of a drive shaft and according to an embodiment of the invention.

FIG. 2C shows the drive subassembly, consisting of the drive gear 33, the drive shaft 21 and drive magnets 52, 53, 54, 55. As shown, four drive magnets are positioned at the ends of the drive arms at the top of the drive shaft. Within a permanent magnet arrangement, the drive magnets are comprised of a plurality of separate magnetic elements including a plurality of magnets. Specifically, drive magnet 54 includes a first magnet portion 170 and second magnet portion 160. Second magnet portion 160 is shown in FIG. 2C as a smaller triangular prism and first magnetic portion 170 is shown as a larger rectangular prism. The reasons for selecting this geometry will be described later. The poles of the first and second magnet portions are shown by the shading on those sections. North poles (+poles, or alternatively south seeking poles) are indicated by the unshaded magnet faces, for example unshaded face 161 of the second magnet of drive magnet 52 and unshaded face 174 of first magnet of drive magnet 52. South poles (−poles, or alternatively north seeking poles) are indicated by the shaded magnet faces, for example shaded face 162 of second magnetic portion of drive magnet 52 and shaded face 173 of first magnet of drive magnet 52.

In constructing each drive magnet, first and second magnets are arranged such that the poles of the first and second magnets portions are opposite one another once assembled as shown in FIG. 2C. Due to the different geometries of the first and second magnets, the same-side outward facing surfaces are not coplanar. Further and more importantly, the magnetic strength of the two magnets must be different with the first magnet being sufficiently dominant in magnetic strength as compared to the second magnet. It should be appreciated that other geometries and arrangements are feasible and that the key aspect is that the magnet field from the second magnet somewhat cancels that of the first magnet in the region and at the end to which the second magnet is attached. The actuator magnets are of identical construction and the same design considerations that apply to the drive magnets also apply to the actuator magnets.

Within the drive subassembly, each of the drive magnets and the first and second magnets that comprise them are all arranged such that adjacent magnets and magnet portions have like poles facing each other. This is demonstrated in the top view of FIG. 2B where the south poles of first portions of drive magnets 52 and 55 are facing one another, as are the south poles of first portions of drive magnets 53 and 54. As a consequence of the selection of four drive arm arrangement, the north poles of each of the first magnets of the drive magnets are also facing each other. Further, the same considerations of polar orientation are applied to the second magnet portions of each of the drive magnets.

Figure 3A:
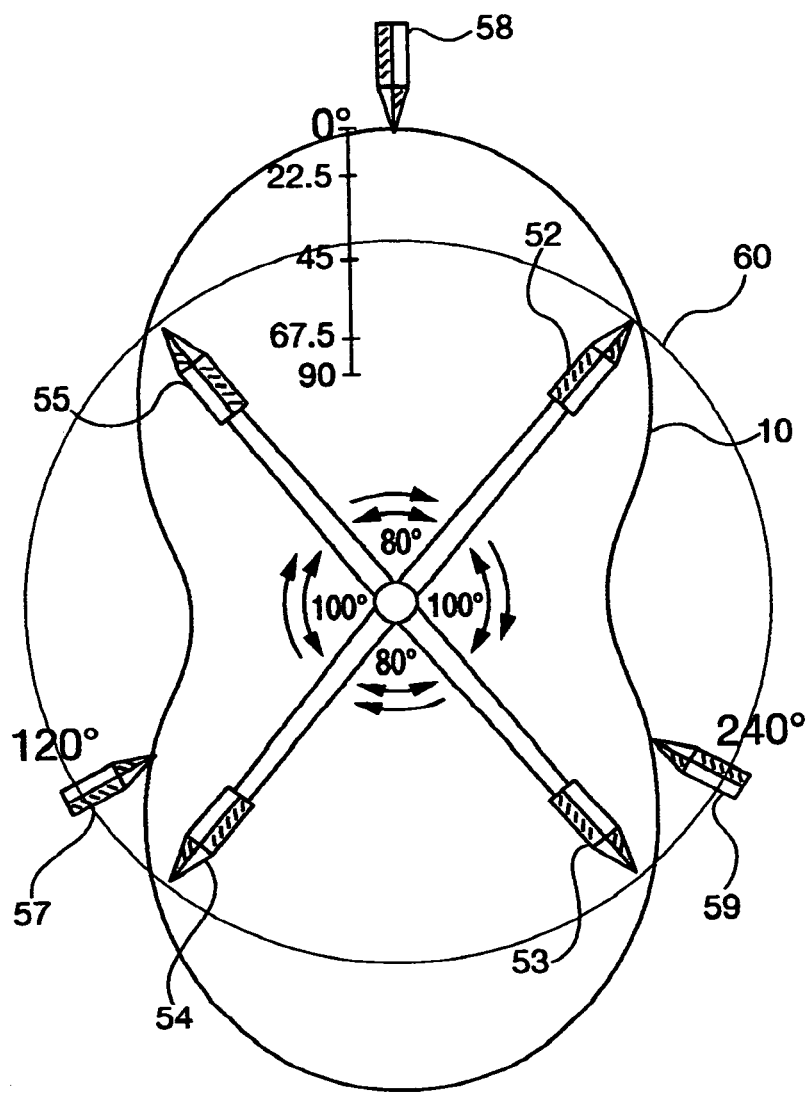
FIGS. 3A-3H are a sequential series of top views of the actuator magnets and the drive shaft with attached drive magnets as the shaft rotates through a portion of a rotational period according to an embodiment of the invention.

The operation of the mechanism of the present invention is shown in FIGS. 3A-3H. In particular, slightly more than a quarter period of rotation of the drive gear 33 is shown in FIGS. 3A-3H illustrating the interactions and travel paths of the actuator and drive magnets during that portion of rotation. As shown in FIG. 3A, the outer perimeter of the circular path of the drive arms and drive magnets is shown at line 60, while the actual path traveled by the actuator magnets is shown by the irregular oblate shape 10. During the operation of the mechanism, the paths traveled by the actuator magnets may be broken up into two portions: work periods and rest periods. The work period occurs when an actuator magnet is within the perimeter 60 of the drive magnet travel path and shown by the indented travel path along actuator magnet travel path 10. The rest period occurs when an actuator magnet is outside perimeter 60 of the drive magnet travel path and shown by the rounded travel path portion along actuator magnet travel path 10. The following aspects should be appreciated and understood by those of skill in the art and with specific reference to the arrangement provided in FIGS. 3A-3H: a) there are two work periods and two rest periods executed by each actuator magnet 57, 58 & 59 during one complete rotation of the drive shaft 21; b) two rotations of the crank gear 35 occur for each rotation of the drive gear 33 such that each actuator executes two work cycles and two rest cycles for each rotation of the drive gear 33; c) the placement of the actuator magnet within the travel perimeter of drive magnets 35 (work periods) is a function of the crank 26 operation; d) all three actuator magnets are 120° out-of-phase with one another at any point in time; and as a result e) at any one time two of the actuator magnets are in one state (work or rest) while the third is in the other state.

The operation of the mechanism will now be described generally and with reference to the relative strengths and directions of the mutual attractions and repulsions for the magnets performing the primary functions of the invention. In general, the magnetic attraction/repulsion forces between any two magnets is provided by Coulomb's law which states that the magnitude of the force of interaction between two point charges is directly proportional to the scalar multiplication of the magnitudes of charges and inversely proportional to the square of the distances between them. The following equation provides a scalar mathematical representation of the attractive or repulsive for force F according to Coulomb's law:

$$|F| = k_e \frac{|q_1 q_2|}{r^2}$$

Where q1 and q2 are the magnitudes of the point charges, r is the distance between the point charges and $k_e = 1/4\pi\epsilon_0$. A detailed explanation as to how an accurate evaluation of the sum of all point charges, say for example on one actuator magnet, is beyond the scope of this application. However, computer models can be used to calculate and provide a sum of the surface integrals for each magnet in the overall system at each point in time to arrive at such a complete mode. Thus, the description below will focus on a high-level evaluation of the overlapping magnetic field lines to describe the operation of the present invention as it pertains to magnetic field interactions.

As mentioned above, the second magnet portion 160 (the "bucking magnet") is selected to be of significantly smaller magnetic strength than the first magnet portion which provides the primary magnetic, and therefore motive, force for the invention. An angular displacement scale regarding the position of the actuator magnet 58 is provided in connection with FIGS. 3A-3H. The discussion below will take place with respect to the one particular actuator magnet 58, although it should be realized that the other two actuator magnets are involved in the same overall cycles albeit at different phases within in their own cycles as the apparatus is operated.

As shown in FIG. 3A, actuator magnet 58 is at 0° position in its cycle and is in the middle of a rest period. In this position, actuator magnet 57 and 59 are at 120° and 240° respectively in their full set of two cycles and both are in their work periods—actuator magnet 58 at the end and actuator magnet 59 at the beginning. The south pole of the first magnet portion of actuator magnet 57 provides an attractive magnetic force on the north pole of the first magnet portion of drive magnet 54 thereby pulling them together and rotating the drive shafts and coupled drive gear clockwise. Likewise, the north pole of the first magnet portion of actuator magnet 59 provides a repulsive magnetic force on the north pole of the first magnet portion of drive magnet 53 thereby repelling them away from one another and also causing the drive shafts and coupled drive gear to rotate clockwise. Both actuator magnets 57 and 59 are within the perimeter of the drive magnet rotation 60 and are in the work portion of their cycles. Actuator magnet 58 is outside the perimeter of the drive magnet and therefore has relatively smaller magnetic interaction with drive magnets 52 and 55, and consequently, has little to no effect on the rotation of the overall drive mechanism. In fact at 0°, actuator magnet 57 is in an equilibrium state within its rest period. The combination of the work cycles being executed by actuator magnets 57 and 59 combined with the angular momentum of the spinning drive assembly allows actuator magnet to continue its rotation clockwise direction thereby moving it along its travel path 10 towards drive magnet 55.

Figure 3B:
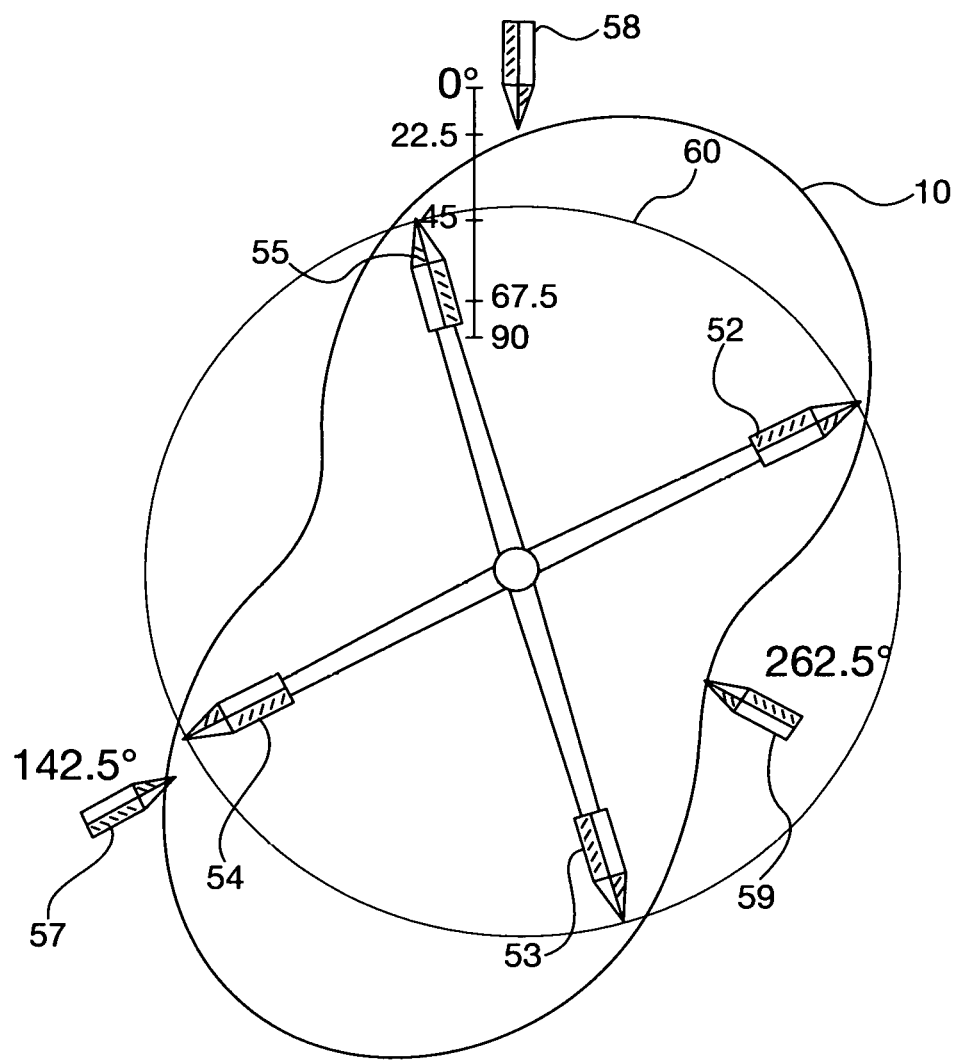

As shown in FIG. 3B actuator magnets 58, 57 and 59 are at 22.5°, 142.5°, and 262.5° respectively within the system's overall cycle. Actuator magnet 58 is still in a rest period but is coming closer to drive magnet 55 where a repelling force begins to be exerted on the two magnets by virtue of the south pole-south pole repulsive force existing between their first magnet portions. This is somewhat overcome by the bucking magnet portions (second magnet portions) as discussed below, allowing the overall mechanism to minimize any loss of angular momentum as this phase is completed. Actuator magnet 57 has exited the drive magnet rotational perimeter 60 and entered a rest period. Similar to actuator magnet 58, however, actuator magnet 57 is relatively close to drive magnet 54 where an attractive force begins to be exerted on the two magnets by virtue of the north pole-south pole attraction existing between their first magnet portions. As with actuator magnet 58, this is somewhat overcome by the bucking magnet portions (second magnet portions) as discussed below, allowing the overall mechanism to minimize any loss of angular momentum as this phase is completed. Actuator magnet 59 is in the middle of its work phase (i.e. half-way completed). In the exact middle of its work phase at 270° actuator magnet 59 is its closest point to drive shaft 21. Here, actuator magnet experiences the greatest sum of magnetic forces, which occurs twice per actuator arm during each full drive shaft rotational cycle. In other words, the mutually repulsive force of actuator magnet 59 with drive magnet 53 and the mutually attractive force of actuator magnet 59 with drive magnet 52, all by virtue of the arrangements of their first magnet portions, is near its maximum in FIG. 3B.

Figure 3C:
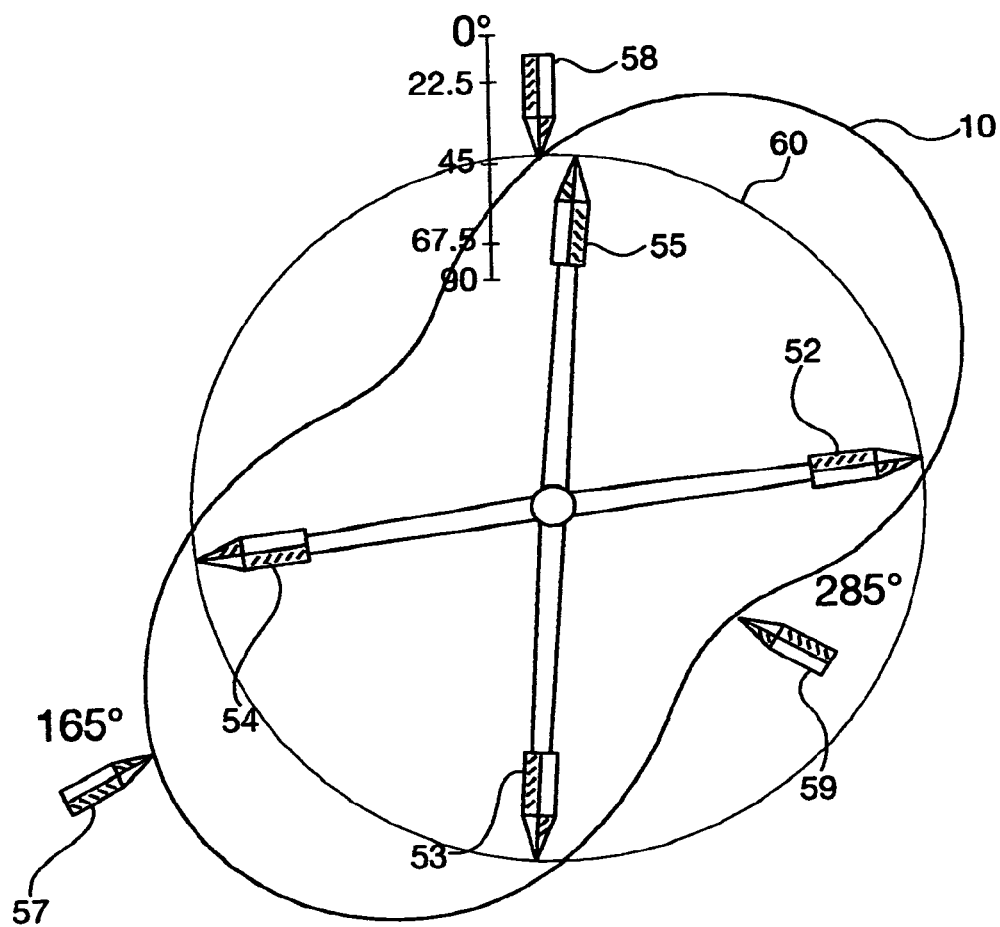

Referring to FIG. 3C, actuator magnets 58, 57 and 59 are at 45°, 165°, and 285° respectively within the system's overall cycle. Actuator magnet 58 begins to come out of its rest period and enter a work period as the north pole-north pole repelling force begins to be exerted between first magnet portions of the actuator magnet 58 and drive magnet 55. Actuator magnet 57 continues to proceed through a rest period. Actuator magnet 59 is beginning the tail end of its work period and coming closer to drive magnet 52.

Figure 3D:
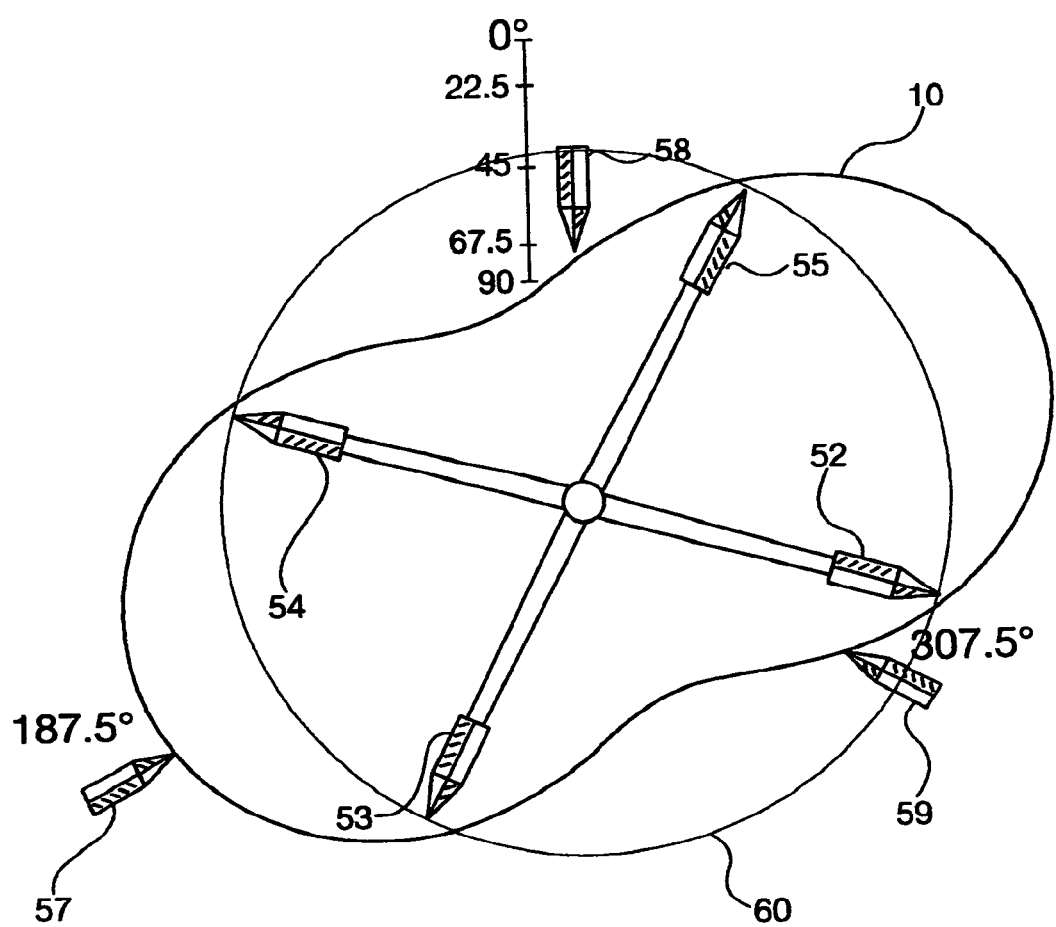

Referring to FIG. 3D, actuator magnets 58, 57 and 59 are at 67.5°, 187.5°, and 307.5° respectively within the system's overall cycle. Actuator magnet 58 is begins to enter its work period and acts substantially like actuator magnet 59 of FIG. 3A. Actuator magnet 57 continues to proceed through a rest period and acts substantially like actuator magnet 58 of FIG. 3A. Actuator magnet 59 is beginning the tail end of its work period and coming closer to drive magnet 52 and acts substantially like actuator magnet 57 of FIG. 3A.

Figure 3E:
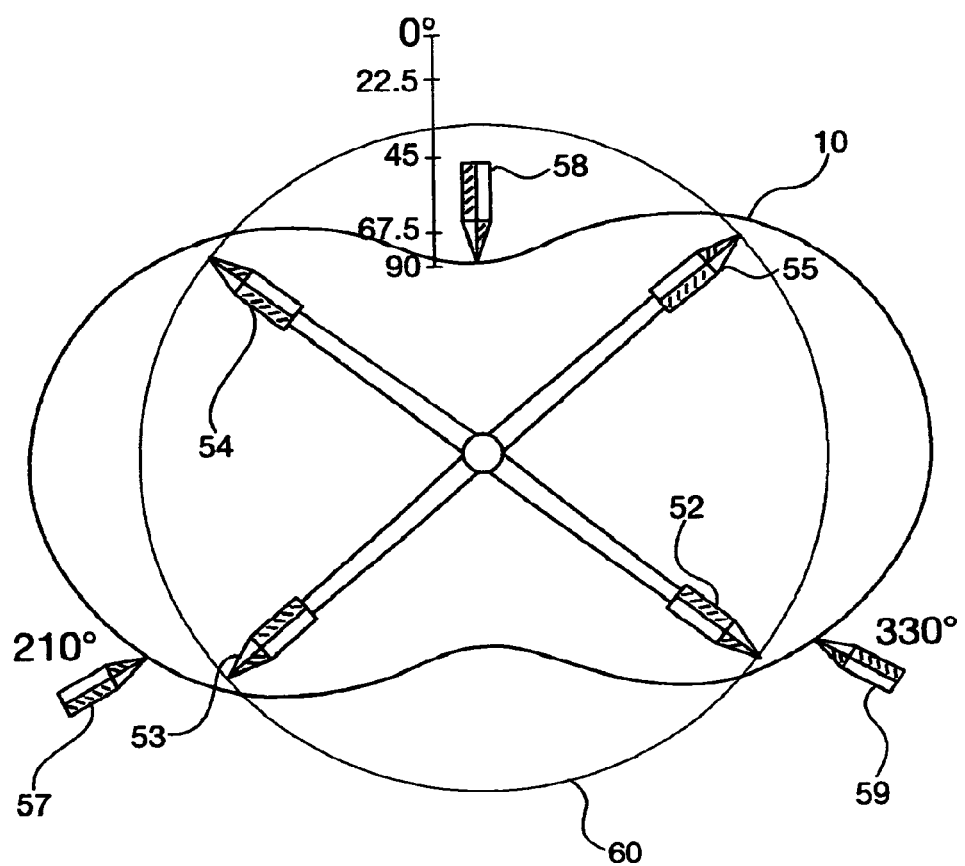

As shown in FIG. 3E actuator magnets 58, 57 and 59 are at 90°, 210°, and 330° respectively within the system's overall cycle. Actuator magnet 58 is in the very middle of its work phase and is at the closest point to drive shaft 21. Here, actuator magnet 58 experiences the greatest sum of magnetic forces, which occurs twice per full drive shaft rotational cycle. In other words, the mutually repulsive force of actuator magnet 58 with drive magnet 55 and the mutually attractive force of actuator magnet 58 with drive magnet 54 are at their maximum, all by virtue of the arrangements of their first magnet portions. Actuator magnet 57 is still in a rest period but is coming closer to drive magnet 53 where a repelling force begins to be exerted on the two magnets by virtue of the south pole-south pole repulsive force existing between their first magnet portions. This is somewhat overcome by the bucking magnet portions (second magnet portions) as discussed below, allowing the overall mechanism to minimize any loss of angular momentum as this phase is completed. Actuator magnet 59 has exited the drive magnet rotational perimeter 60 and entered a rest period. Similar to actuator magnet 57, however, actuator magnet 59 relatively close to drive magnet 52 where an attractive force begins to be exerted on the two magnets by virtue of the north pole-south pole attraction existing between their first magnet portions. As with actuator magnet 57, this is somewhat overcome by the bucking magnet portions (second magnet portions) as discussed below, allowing the overall mechanism to minimize any loss of angular momentum as this phase is completed.

Figure 3F:
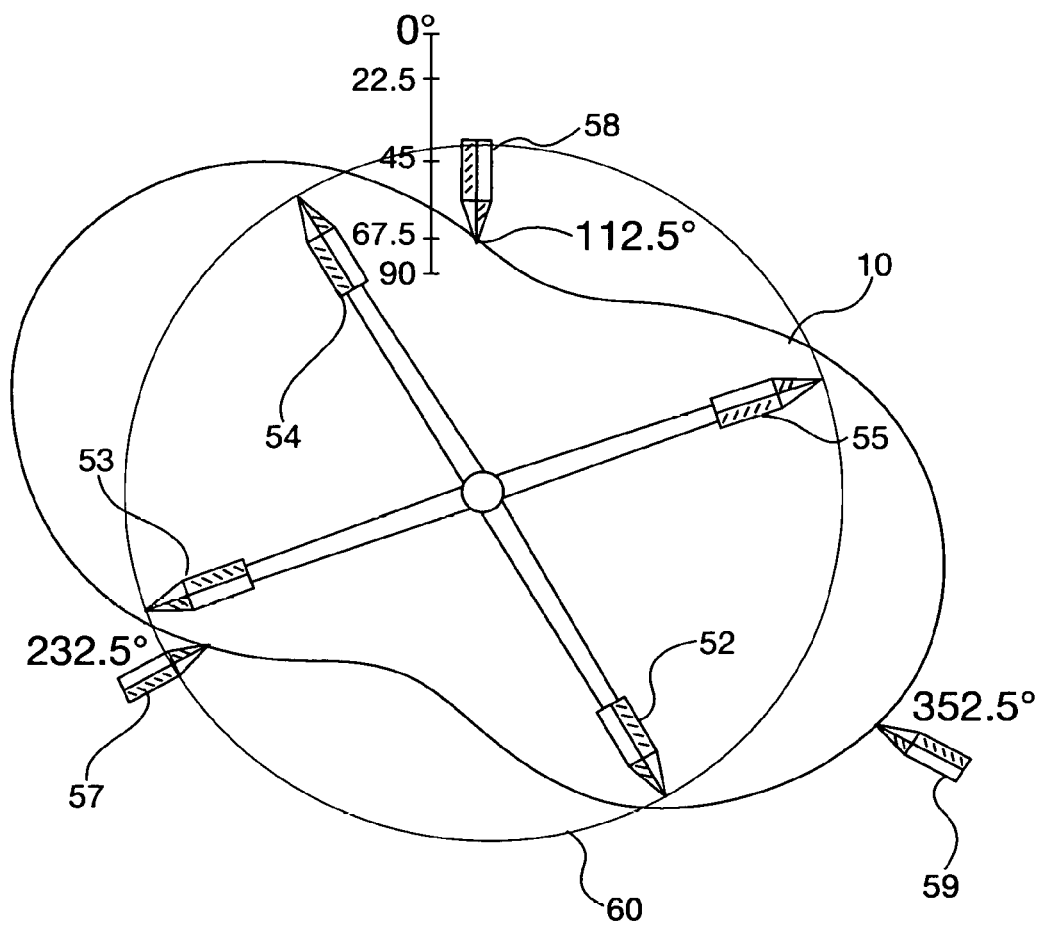
Figure 3G:
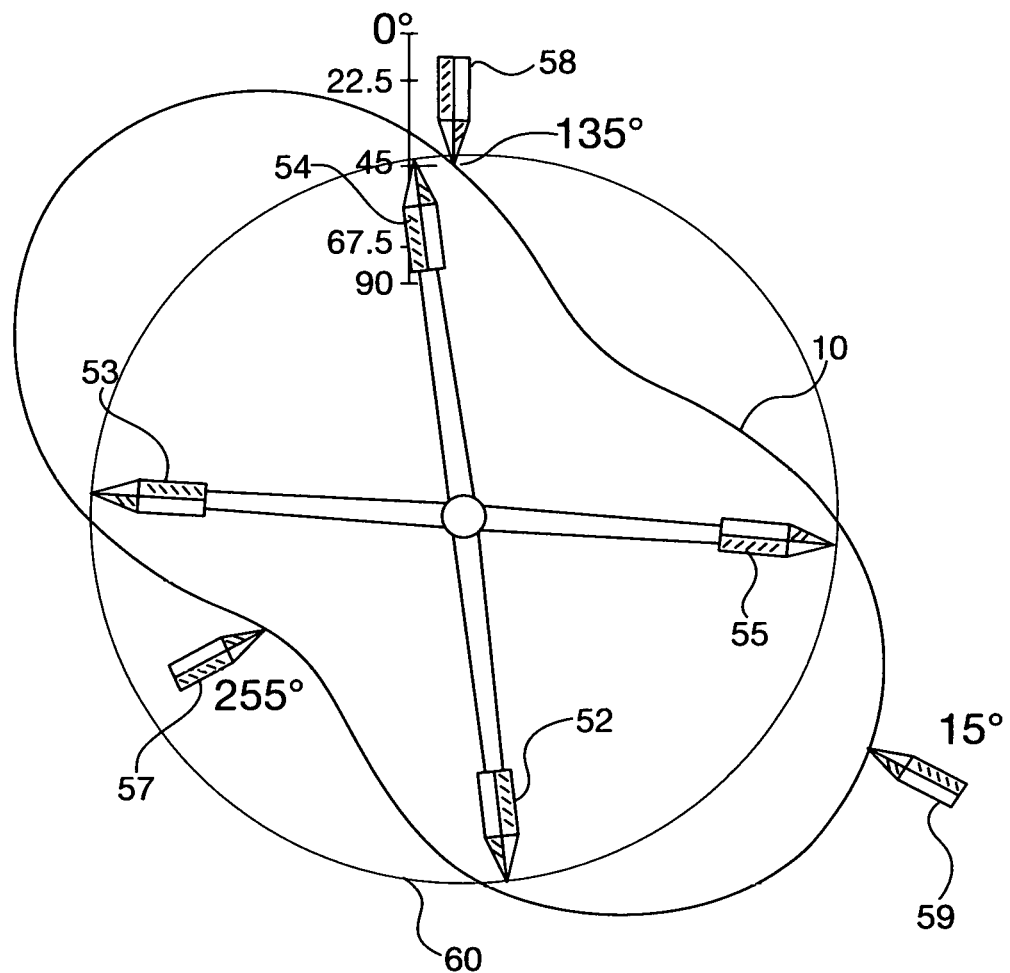
Figure 3H:
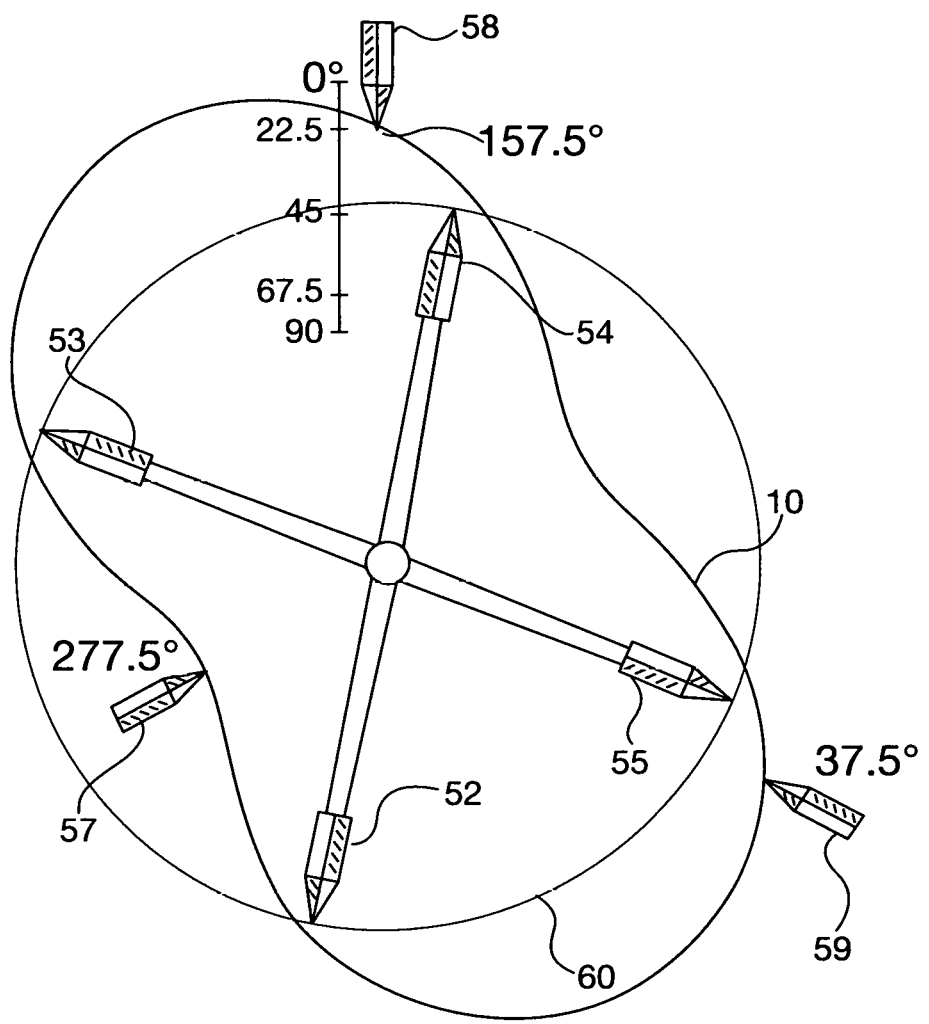

FIGS. 3F and 3G show the tail portion of the work cycle of actuator magnet 58 as it travels to angular positions 112.5° and 135° respectively. FIG. 3H shows the entry of the actuator magnet into its next rest period at angular position 157.5°. The actuator magnets in these positions act in a manner similarly as that described with respect to the previous figures in which the actuator magnets occupy similar relative positions within the work and rest periods. In this way, the actuator magnets move into and out of the magnetic fields created by the drive magnets, which in turn moves the actuator arm 28 as it slides upon two guide rails. The actuators arms are connected to rod 27 and crank 26 that are attached to the crank gear 35. Energy is transferred from the crank gear to spacing gear 34, which in turn is transferred to drive gear 33 at the bottom of the drive shaft 21. Thus, the complete apparatus of the present invention is a relatively, self-sustaining machine—discounting all friction—in which, each actuator take turns providing the required forces. In sum, one actuator magnet is put into a work position using the energy provided by another actuator magnet that has just completed a work period. The working actuator magnet applies a torque to the drive magnets, causes the drive shaft to turn, and powers the machine until it comes to the end of its work period. By this time, it has provided the relatively small amount of energy necessary to place the next actuator magnet into the work position. The next actuator magnet in turn provides the relatively small amount of energy to move the previously working actuator magnet into the rest position. The cycle then repeats from the perspective of second actuator in view of the third.

This cycle continues repeatedly as each actuator facilitates the work of the next actuator in scheduled to complete a work cycle.

A few dimensional considerations should be noted. In general, the gearing ratios needed to construct the apparatus of the present invention are variable, and may be selected to fit a particular system conforming to a particular number and size of the intermeshing gears, e.g. the drive gear 33, spacing gear 34 and actuator gear 35. The size and gear ratios of the larger drive gear 33 and the actuator gear 35 also depends on the number of drive magnets. The construction of such gearing mechanisms is generally known by those of skill in the art. In the particular proposed model of FIG. 1 in which four drive magnets, 52, 53, 54 and 55 are disposed about the drive shaft 21, where it is shown with approximately ninety degree angles between the drive arms, a rotational ratio of 2:1 between the drive gear 33 and the actuator gear 35 is most desirable such that one rotation of the drive shaft 21 results in two rotational cycles of each actuator gear 35. Thus, each rotational cycle of an actuator gear, and corresponding extension and retraction of the actuator arm and actuator magnet, consists of one work period in which the actuator magnet is within the perimeter of the drive magnet' rotational space and one rest period in which it is not. Further, all three actuators use the same two quadrants of the drive assembly for the work period and rest period respectively. Thus, the drive assembly has two work quadrants that are 180° out-of-phase with each other and two rest quadrants that are likewise 180° out-of-phase with each other.

After experimentation, it has been determined that 100 degree and 80 degree spacing angles are more desirable separations between consecutive drive arms. This is shown in FIG. 3A. This spacing provides for better work cycles in that the travel path is more of a "peanut shape' which permits more work to be accomplished by the actuator arm during each work cycle. The length of oscillation, or how far the actuator magnet extends into the outside boundary or perimeter of that plane of rotation 60 radius, determines the amount of work done by the actuator arm during each work period. Further, this spacing is more conducive to avoiding collisions between the actuator and drive magnets. On one full rotation of the drive magnets and drive shafts results in two actuator work cycles. In fact, at an even separation of ninety degrees between drive shaft arms, a geometric problem in operation is actually created in that if the equilibrium point of oscillation of the actuator is not outside the radius of the drive head, the actuator magnets would have overlapping paths with the drive magnets and would therefore collide with them. For these reasons, the angular separation of the drive arms 23 within the two work quadrants are larger than ninety degrees to avoid collisions of the magnets and move the equilibrium of the actuators inward to maximize the work period. The exact measurement of this angle varies as between various embodiments of the overall system and may be empirically determined to achieve the maximum output power.

Bucking Magnets and Device Fields

Figure 4A:
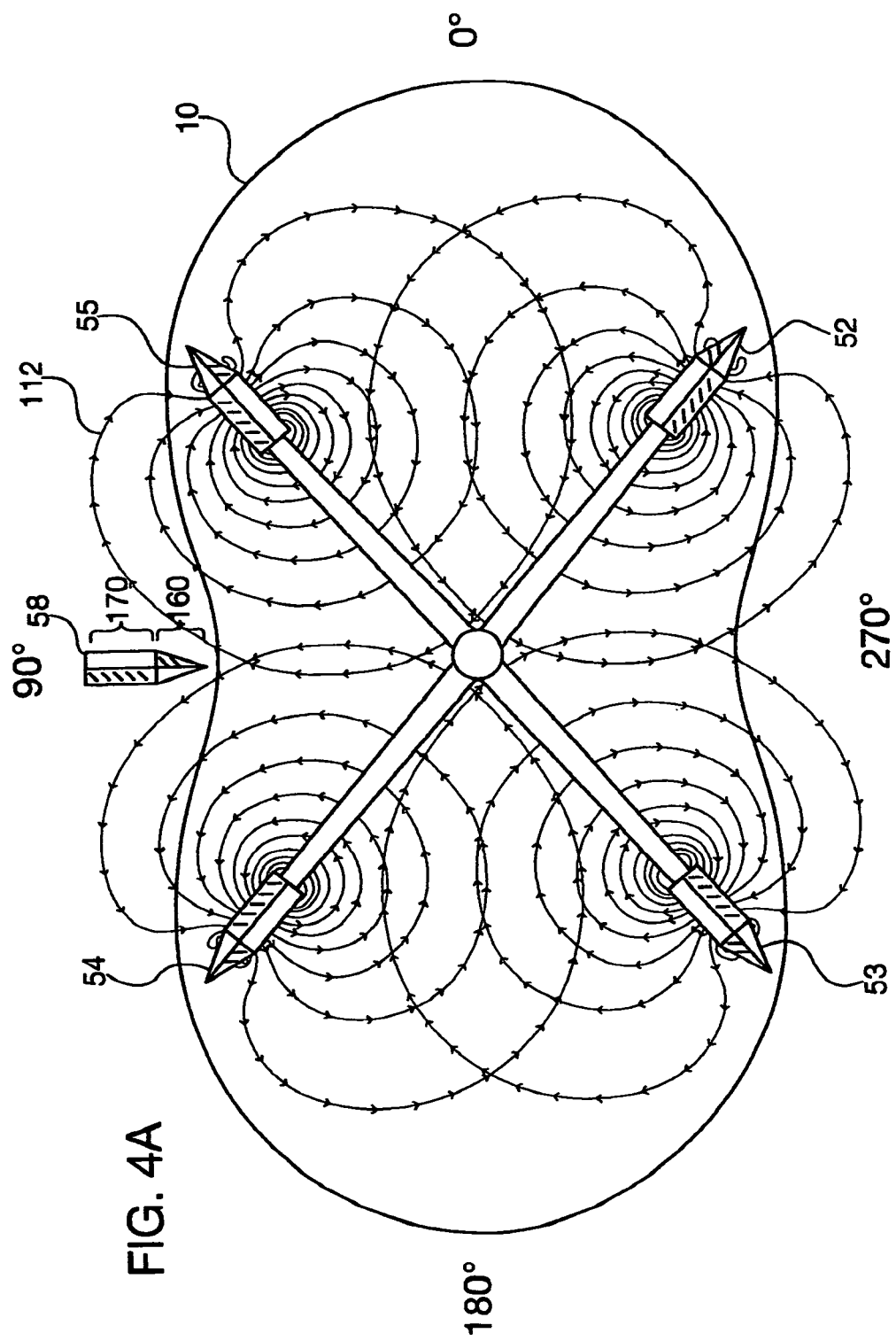
FIG. 4A is a magnetic field diagram showing the magnetic flux of the drive magnets according to an embodiment of the invention.

FIG. 4 provides a magnetic field diagram of only the drive magnets 52, 53, 54 and 55. One actuator magnet 58 is shown at one of the two maximum work positions along its 360° travel path. Per magnetic field diagram convention, the arrow heads on the magnetic field lines show the direction of the magnetic force created on the north pole of a magnet disposed within the field. Thus, the north point of a compass would point in the direction of the arrows on the field lines when placed within the field. It should also be appreciated that the line density shown on FIG. 4A is an indication of field strength and that the field strength decreases inversely with the square of the distance between any to two magnets. The closer the lines are together, the stronger the magnetic field in that location. As can be seen from FIG. 4, the magnetic force experienced by the actuator magnet at any give location along the actuator travel path is really the sum of the field effects of each of the four drive magnets within the combined magnetic field created by the four drive magnets. Per Coulombs law discussed above and assuming that that the size and magnetic composition of each of the drive magnets is identical, the relative distance from the drive magnet is the only determinative factor in evaluating the magnetic strength on any one actuator magnet.

Figure 4B:
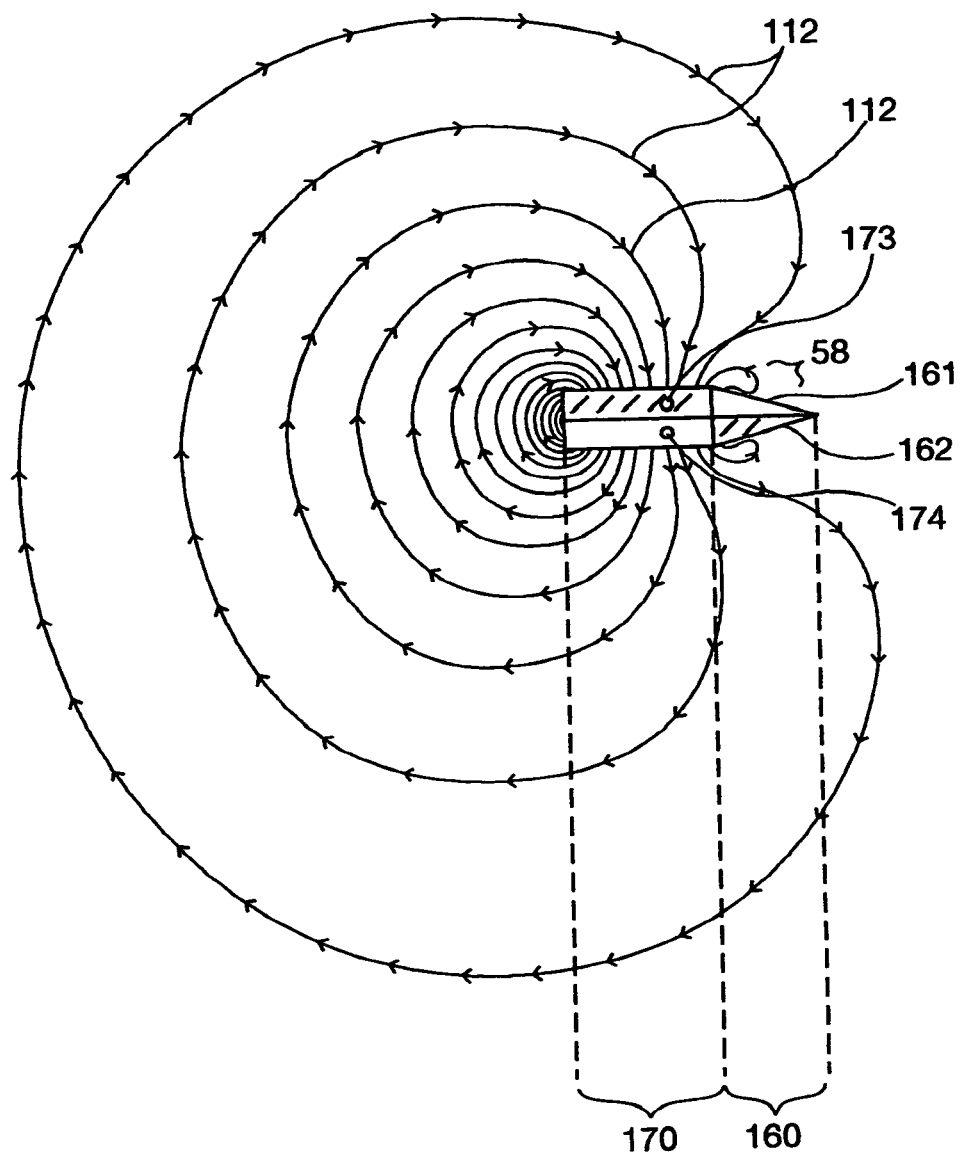
FIG. 4B is a magnetic field diagram showing the magnetic flux a single multi-component magnet used in an embodiment of the invention.

As seen in FIGS. 1, 2C and 4A, both the actuator magnets and the drive magnets have a unique construction in one particularly preferred embodiment of the invention. A representative magnet is shown at FIG. 4B. Each magnet is comprised of two magnet portions, a first magnet portion 170, disposed at the end of the magnet secured to the drive arm or actuator arm, and a second magnet portion 160. As with all magnets, each of the first and second magnet portions have north poles, 174 & 161 respectively, and south poles, 173 & 162, and respectively. The field lines of the first magnet portion 112 are shown primarily in FIG. 4B radiating outward from the north to the south pole of that magnet portion. However, the addition of the "bucking magnet" (second magnet portion 160) at the end of the first magnet portion, changes the overall field characteristics of a simple bipole actuator and drive magnet at the end at which the bucking magnet is attached. In particular, second magnet portion 160 is chosen to be relatively smaller in size than the first magnet portion, and thus exerts a relatively smaller magnetic field. Further, second magnet portion is affixed to the first magnet portion at one end, bridging the two poles of the first magnet portion and having its poles reversed from those of the first portion. Also, the geometry of the second magnet portion is chosen to be a triangular prism in one particularly preferred embodiment. In the arrangement shown in FIG. 4B, the combination of the smaller second magnet portion, disposed with its poles reversed and end-slanted surfaces creates a unique magnetic field at the tip end of the bucking magnet. Specifically, the magnet field of the bucking magnet significantly cancels the magnetic field of the first magnet portion in the tip end of the bucking magnet. Likewise the field of the bucking magnet itself is cancelled by the first magnet portion resulting in the tips of the actuator and drive magnets having relatively weak, combined magnetic field characteristics. This reduces the energy needed to move actuator magnets from rest positions and into work position and is one of the key aspects to the efficient operation of the present invention. It is because of this field cancellation that the actuator and drive magnets can be so close in proximity during certain portions of the machine cycle, e.g. during the transitions from work periods to resting periods and vise-versa. Since the magnet fields at the tips of the actuator and drive magnets are significantly cancelled, the main magnet motive force is provided by the magnetic interaction of the first magnetic portions of the drive and actuator magnets, and the respective tips of the same can come within a small distance of one another without adversely affecting this primary magnetic interaction. Thus the two other actuator magnets, at least one of which is in a work cycle, have enough work potential (stored energy) to complete the transition of the actuator magnet to a work position.

With respect to magnet construction, first and second magnet combinations that have pointed tips are desirable so as to allow for the actuator magnet to be smoothly moved inside the perimeter of the drive magnets' rotation and maximize the work period while still avoiding collisions between the actuator and drive magnets. As provided for in the present invention, rectangular magnets that taper at the ends are one desirable embodiment. However, it should be appreciated that the selection of other geometries and magnetic properties of both the first magnet portion and the bucking magnet may result in additionally beneficial field cancellation effects at the tips of the drive and actuator magnets. In particular, a conical, pyramidal or otherwise pointed bucking magnet may be used in place of a triangular prism. With respect to magnet material, Neodymium is one preferred material for the permanent magnets of the present invention given its superior magnetic properties. Other permanent magnetic materials may also be used. Finally, electromagnets may be substituted for the permanent magnets. Such magnetic systems may be computer controlled, dynamically, so as to produce magnetic fields that are optimally efficient for any particular machine operation.

FIG. 5A shows a graph 210 of the distance of the actuator magnet from the drive shaft 21. One exemplary actuator magnet 258 is shown at a phase of 90°—equidistant between the two drive magnets 254 and 255 and at the closest point to the drive shaft. The graph is normalized to the distance of the drive magnet's rotational perimeter where the unitary value of one indicates the point at which the actuator magnet crosses that perimeter. An understanding of magnetic interactions between the actuator magnets and the drive magnets can be clearly understood from this figure if one envisions the magnetic field pattern shown in FIG. 4B superimposed upon the actuator magnet 258 at various points in the travel path 210. At point 202, the number of magnetic field lines of the actuator magnet overlapping those of the drive magnet 255 would few and the relative distance between the magnetic lines of each respective magnet is large indicating a weaker magnetic field. As the actuator magnet increases in is phase relationship and physically approaches drive magnet 255, the number of overlapping field lines between the two magnets increases as does the strength of the magnetic fields of each of the overlapping lines (i.e. the overlapping lines are closer together). This is particularly true of the field lines pertaining to the first magnet portions of the actuator magnet 258 and drive magnet 255, which would initially indicate a strong repulsive force as the actuator magnet approaches point 203 since the south poles of the first portions of the actuator and drive magnets are facing one another. However, looking at the second magnet portions of the superimposed field diagrams, the bucking magnet portions have caused a cancellation of the magnetic field lines of the first portions of the two magnets in the region of the passing magnet tips. Further, since the field lines that do exist cross each other in a relatively perpendicular direction to one another, the amount of energy required to move the actuator magnet past the drive magnet is minimized. Both of these effects encourage the actuator magnet to move easily past the drive magnet with a minimal expenditure of energy in doing so.

As the actuator magnet travels past point 203 on its way to point 204, the primary magnetic force on the drive magnet 255 and actuator magnet 258 is a repulsive one due to the first magnet portions of the two magnets both being north poles. At point 204, the interaction of the field lines is strong with numerous, very closely spaced lines overlapping and therefore indicating a strong force begin exerted on the two magnets causing them to move away from one another. As the actuator magnet moves to point 205, the magnetic force between actuator magnet 258 and drive magnet 255 begins to weaken since the interaction of the field lines becomes less numerous and more spaced out. When actuator magnet reaches point 205, the equidistant point between drive magnets 255 and 254, the repulsive force between first portions of actuator magnet 258 and drive magnet 255 weakens considerably due to the separation distance increasing and the effects of the inverse square relationship to the magnetic field interaction. However, at point 205 the attractive force of the first portions of the actuator magnet 258 and drive magnet 254 begin to increase due to the interaction of their respective magnetic fields. As the actuator magnet travels to point 206, this attractive force dominates the magnetic interaction of the magnets, accelerating the actuator magnet to the drive magnet perimeter point in the travel path at 207. The nature of the magnetic forces between the actuator magnet and drive magnet 255 on the way up from 90° in the phase relationship to a phase of 135° (attraction phase 207) are the same in nature as the magnetic forces between the actuator magnet and drive magnet 254 on the way up from 90° in the phase relationship to a phase of 135° (repulsion phase 206). It is the sum of the forces in these two phases that provide the motive force within the work period for each intrusion of the actuator magnet into the perimeter of the drive magnet rotation.

FIG. 5B shows a graph of the force 302 on the actuator magnet duet to the first drive magnet as a function of the operational phase of the machine. The force is normalized at the point of the intrusion of the actuator magnet into the perimeter of the drive magnet rotation (i.e. starts at value 1 at 45°) and does not include the effects of the bucking magnets. As can be seen from FIG. 5B, the force on the actuator magnet decays rapidly as the actuator magnet travels to 90° phase at point 205 in FIG. 5A. From there, its further rapid decay results in the effect of the first drive magnet becoming quite inconsequential beyond 90°, i.e. during the attractive phase 207 of FIG. 5A.

FIG. 5C shows a graph of the force 304 on the actuator magnet due to the second drive magnet as a function of the operational phase of the machine. This is essentially an inverse of the function as provided by the force 302 shown in FIG. 5B. The force is normalized at the point of the exit of the actuator magnet from the perimeter of the drive magnet rotation (i.e. starts at value 1 at 135°) and does not include the effects of the bucking magnets. As can be seen from FIG. 5C, the force on the actuator magnet increases rapidly as the actuator magnet travels past the 90° phase at point 205 in FIG. 5A. From there, the force on the actuator magnet rapidly increases and becomes quite large beyond 90°, i.e. during the attractive phase 207 of FIG. 5A.

FIG. 5D shows a graph of both the repulsion force 302 and attraction force 304 on the actuator magnet duet to the first and second drive magnets as a function of the operational phase of the machine. The sum of these two is provided in graph 306. As can be seen from FIG. 5D, a trough-shaped force function on the actuator arm is clearly evident when the combined effects of the two forces are considered and the propagated motion on the drive shaft is realized, which in turn propels the actuator arms.

FIG. 5E shows a graph of work performed by the actuator during one work cycle. Since the work is the integral of the force(s) due to the respective magnet interactions, the work performed by the actuator magnet due to the first magnet is shown as 402, the work performed by the actuator magnet due to the second magnet is shown as 404, and the sum of the work of these to is shown as 406.

In a theoretical, ideal machine assembled according to the present invention, all elements of the apparatus are frictionless and without secondary retarding forces apart from the magnet forces at play. In such an ideal machine, the present invention would operate perpetually. The resulting angular force created by the magnetic interactions of the drive and actuator magnets would be equal to or greater than the amount of force necessary to keep the machine in motion. Any surplus energy could be used to provide power for other appliances. For example, the drive shaft could be connected to an alternator such that the rotational energy would be converted to and stored as electrical energy.

In a non-ideal, real-world environment, friction and resistive forces should be minimized to improve the efficiency of the machine. Depending on the size of the apparatus, ball bearings may be used for the axles that hold the gears. With respect to the actuator assembly—the crank 26, connecting rod 27, and actuator arm 28—each part should be made of light-weight materials to minimize interfering effects of inertia on the reciprocating motion. The drive gear 33 should be weighted around its circumference to serve as a fly wheel and smooth out the vibrations caused by inertia of the actuators thereby keeping the machine from stalling. In order to avoid interfering forces created by the magnets, all parts other than the magnets should be constructed of non-magnetic materials such as aluminum or brass. All of these construction criteria reduce the loss of energy and increase efficiency.

Since the spinning magnets create electromagnetic waves, shielding may also be necessary to keep these waves from radiating out from the machine. The resulting radiation may interfere with external appliances, electronics or may cause health problems. Therefore, it is necessary to enclose the apparatus with shielding provided by a high magnetic permeability metal alloy.

While the invention has been shown and described with reference to specific preferred embodiments, it should be understood by those skilled in the art that various changes in form and detail may be made therein without departing from the spirit and scope of the invention as defined by the following claims.

What is claimed is:

1. An apparatus for sustaining motion comprising:
   an actuator, said actuator having an actuator magnet coupled to an actuator arm, said actuator magnet being comprised of a plurality of magnets, said actuator arm coupled to a rod, said rod coupled to a crank which is coupled to a crank gear, said crank gear meshably engaged with a spacing gear; and
   a drive gear meshably engaged with said spacing gear, said drive gear coupled to a drive shaft disposed in the rotational center of said drive gear, said drive shaft coupled to a plurality of drive arms, each drive arm coupled to a drive magnet, said actuator magnets being alternately attracted and repelled by said drive magnets when said central gear is spinning so as to continuously rotate said spacing gear, said crank gear, and said crank to push said rod and move said actuator arm and said actuator magnets towards and away from said drive shaft.

2. The apparatus of claim 1 wherein each of said drive magnets are within a first common plane, each of said actuator magnets are in a second common plane and said first and second common planes are coplanar.

3. The apparatus of claim 1 wherein at least one of said drive magnets is comprised of a plurality of magnets.

4. The apparatus of claim 1 wherein said plurality of magnets of said actuator includes a first magnet portion disposed towards said actuator arm and a second magnet portion disposed away from said actuator arm.

5. The apparatus of claim 4 wherein said first and second magnet portions each have two poles, said first and second magnet portions being coupled such that said poles of said two magnets are disposed opposite one another.

6. The apparatus of claim 4 wherein said first magnet portion is a rectangular prism and said second magnet portion is a triangular prism containing a pointed tip, said pointed end of said triangular prism being disposed at an end of the actuator such that said pointed end is the part of the actuator magnet that is closest to said drive shaft.

7. The apparatus of claim 6 wherein magnetic field created by said second magnet portion cancels a portion of the magnetic field created by said first magnet portion.

8. The apparatus of claim 1 wherein said plurality of drive arms are spaced at alternating angular displacements of 80 degrees and 100 degrees about said drive shaft.

9. The apparatus of claim 1 wherein said plurality of magnets of said actuator are one or more electromagnets.

10. The apparatus of claim 9 wherein said operation of said electromagnet is computer-controlled.

11. A method for sustaining motion within a magnetically operating apparatus, said apparatus including at least one actuator having an actuator magnet coupled to an actuator arm, said actuator magnet being comprised of a plurality of magnets, said actuator arm coupled to a rod, said rod coupled to a crank which is coupled to a crank gear, said crank gear meshably engaged with a spacing gear; a drive gear meshably engaged with said spacing gear, said drive gear coupled to a drive shaft disposed in the rotational center of said drive gear, said drive shaft coupled to a plurality of drive arms, each drive arm coupled to a drive magnet, said method comprising:
   inserting said actuator arm into a plane of rotation, said plane of rotation created by the rotation of said plurality of drive arms, said outer edge of said plane of rotation defined by the ends of said plurality of drive magnets;
   extracting said actuator arm from said plane of rotation; and
   repeating said steps of inserting and extracting said actuator arm so as to continuously rotate said drive shaft.

12. The method of claim 11 wherein said actuator arm is inserted into and extracted from said plane of rotation sequentially, said insertions occurring only during a work period of said drive shaft rotation.

13. The method of claim 11 further comprising providing power to an apparatus attached to said drive shaft through the rotation of said drive shaft.

14. The apparatus of claim 1 further comprising a plurality of said actuators, each of said actuators having an actuator magnet coupled to a corresponding actuator arm, each of said actuator magnets being comprised of a plurality of magnets, each of said actuator arms coupled to a rod, each of said rods coupled to a crank, each crank being coupled to an associated crank gear, said plurality of crank gear meshably engaged with said spacing gear.

* * * * *